(12) United States Patent
Boudreau

(10) Patent No.: US 11,198,943 B2
(45) Date of Patent: Dec. 14, 2021

(54) ELECTROCHEMICAL REACTOR FOR GENERATING ACTIVE COMPOUNDS FROM PRECURSORS

(71) Applicant: INNOVATIVE POTENTIAL INC., Sault Ste. Marie (CA)

(72) Inventor: Jordache Boudreau, Sault Ste. Marie (CA)

(73) Assignee: INNOVATIVE POTENTIAL INC., Sault Ste. Marie (CA)

( * ) Notice: Subject to any disclaimer, the term of this patent is extended or adjusted under 35 U.S.C. 154(b) by 0 days.

(21) Appl. No.: 16/329,715

(22) PCT Filed: Aug. 10, 2018

(86) PCT No.: PCT/CA2018/050974
§ 371 (c)(1),
(2) Date: Feb. 28, 2019

(87) PCT Pub. No.: WO2019/028560
PCT Pub. Date: Feb. 14, 2019

(65) Prior Publication Data
US 2020/0157695 A1    May 21, 2020

(30) Foreign Application Priority Data

Aug. 10, 2017 (CA) .................................. CA 2975932

(51) Int. Cl.
*C25B 9/19* (2021.01)
*C25B 9/65* (2021.01)
(Continued)

(52) U.S. Cl.
CPC .................. *C25B 15/02* (2013.01); *C25B 3/23* (2021.01); *C25B 3/25* (2021.01); *C25B 9/19* (2021.01); *C25B 9/65* (2021.01); *C25B 11/02* (2013.01)

(58) Field of Classification Search
CPC ........................................................ C25B 1/04
(Continued)

(56) References Cited

U.S. PATENT DOCUMENTS

| 723,398 A * | 3/1903 | Le Sueuer ................ C25B 1/46 |
| | | 205/516 |
| 4,402,812 A * | 9/1983 | Panter ...................... C25B 9/00 |
| | | 204/275.1 |

(Continued)

FOREIGN PATENT DOCUMENTS

CA      2685866 A1     1/2009

OTHER PUBLICATIONS

"Fenestration." Merriam-Webster.com Dictionary, Merriam-Webster, https://www.merriam-webster.com/dictionary/fenestration. Accessed Jul. 28, 2020. (Year: 2020).*
(Continued)

*Primary Examiner* — Harry D Wilkins, III
(74) *Attorney, Agent, or Firm* — Marshall, Gerstein & Borun LLP

(57) ABSTRACT

Devices for electrochemically activating precursor compound through oxidation (or reduction) to produce active compound are provided. Devices may include an electrochemical reactor having an electrochemical cell including an anode and a cathode housed in a shared compartment, or an anode housed in an anode compartment, a cathode housed in a cathode compartment, and a semipermeable membrane separating the anode and cathode compartments, wherein the anode and cathode form an electrical circuit in the presence of electrolyte solution; and a sealed housing enclosing the electrochemical cell, the housing including a precursor compound input in communication with the anode/cathode/shared compartment, for inputting precursor compound, an active compound output in communication (Continued)

with the anode/cathode/shared compartment for outputting activated compound following activation, and a gas release and/or liquid overflow port; a power supply powering the electrochemical reactor; and, optionally, a pump or valve controlling flow rate of the assembly.

15 Claims, 25 Drawing Sheets

(51) Int. Cl.
*C25B 15/02* (2021.01)
*C25B 11/02* (2021.01)
*C25B 3/23* (2021.01)
*C25B 3/25* (2021.01)

(58) Field of Classification Search
USPC .................................................. 205/688–703
See application file for complete search history.

(56) References Cited

U.S. PATENT DOCUMENTS

| | | | | |
|---|---|---|---|---|
| 5,753,105 | A * | 5/1998 | Johnson | G01N 1/4077 210/141 |
| 5,843,292 | A | 12/1998 | Spiros | |
| 6,375,812 | B1 * | 4/2002 | Leonida | C25B 1/04 204/269 |
| 9,624,587 | B2 * | 4/2017 | Yoshida | C25B 9/08 |
| 2001/0039393 | A1 * | 11/2001 | Mori | A61N 1/044 604/22 |
| 2001/0039481 | A1 * | 11/2001 | Tremblay | H01M 8/04589 702/35 |
| 2003/0015419 | A1 * | 1/2003 | Bakir | C02F 9/005 204/252 |
| 2003/0213505 | A1 | 11/2003 | Price et al. | |
| 2004/0045815 | A1 * | 3/2004 | Tseng | C02F 1/46104 204/252 |
| 2004/0065542 | A1 * | 4/2004 | Fairfull | C25B 15/00 204/228.2 |
| 2004/0203166 | A1 * | 10/2004 | Sullivan | C25B 11/02 436/161 |
| 2005/0006592 | A1 * | 1/2005 | Kitada | C02F 1/005 250/428 |
| 2005/0217991 | A1 * | 10/2005 | Dahlquist, Jr. | C25B 15/00 204/267 |
| 2007/0042480 | A1 * | 2/2007 | Rozendal | C25B 9/08 435/168 |
| 2008/0047830 | A1 * | 2/2008 | Fairfull | C25B 11/00 204/276 |
| 2008/0190763 | A1 * | 8/2008 | Del Signore | C25B 9/00 204/278 |
| 2009/0023804 | A1 * | 1/2009 | Baugh | A61P 31/12 514/456 |
| 2016/0236955 | A1 | 8/2016 | Luo et al. | |

OTHER PUBLICATIONS

"Pharmaceutical", Merriam-Webster Dictionary, available at https://www.merriam-webster.com/dictionary/pharmaceutical, accessed on Jan. 16, 2021 (Year: 2021).*
"Drug", Merriam-Webster Dictionary, available at https://www.merriam-webster.com/dictionary/drug, accessed on Jan. 16, 2021 (Year: 2021).*
"Medication", Merriam-Webster Dictionary, available at https://www.merriam-webster.com/dictionary/medication, accessed on Jan. 16, 2021 (Year: 2021).*
"Medicinal", Merriam-Webster Dictionary, available at https://www.merriam-webster.com/dictionary/medicinal, accessed on Jan. 16, 2021 (Year: 2021).*
Food and Drug Administration Compliance Program Guidance Manual for Program 7356.002E, Compressed Medical Gases, Mar. 2015, available at https://www.fda.gov/media/75194/download (Year: 2015).*
Boudreau et al., "Electrochemical activation of chemotherapeutic produrges that mimic P450-catalyzed oxidation: proof-of-concept for a focal approach to chemical cancer treatment," *Can. J. Chem.*, 91:960-967 (Jun. 3, 2013).
International Search Report and Written Opinion for Application No. PCT/CA2018/050974, dated Oct. 22, 2018.

\* cited by examiner

Prior Art

A

B

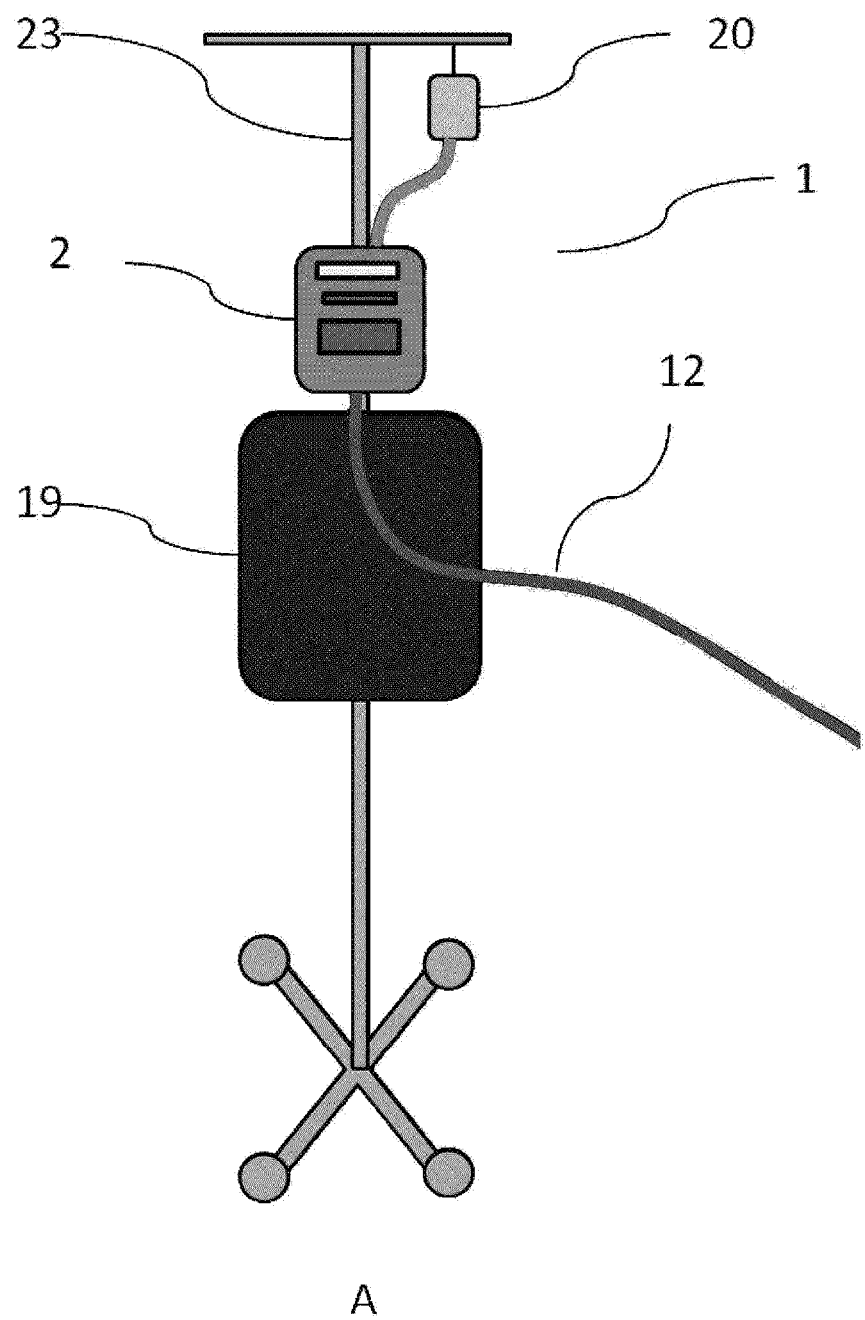

B

C

A

ELECTROCHEMICAL REACTOR FOR GENERATING ACTIVE COMPOUNDS FROM PRECURSORS

CROSS-REFERENCE TO RELATED APPLICATIONS

This application is the U.S. national phase of PCT Application No. PCT/CA2018/050974, filed on Aug. 10, 2018, which claims priority to Canadian Patent No. 2,975,932, filed on Aug. 10, 2017, the entire disclosures of which are hereby incorporated by reference in their entirety.

FIELD OF INVENTION

The present invention relates generally to electrochemical reactor devices. More specifically, the present invention relates to devices for electrochemically activating a precursor compound to produce an active compound.

BACKGROUND

Many therapeutic drugs depend on in vivo enzymatic modification for activity. In such cases, it is often one or more metabolites produced from the administered drug which actually performs the intended biological function in the subject. Cytochrome P450 enzymes, in particular, play a large role in drug metabolism in vivo. These enzymes are generally considered as oxygenase enzymes which oxidize drug compounds. Many chemotherapeutic agents, for example, are oxidatively converted to their bioactive metabolite(s) by cytochrome P450 enzymes following administration.

For therapeutic drugs which rely on enzymatic activation for biological activity, dosages are often elevated to account for incomplete metabolic conversion or detoxification processes. Particularly where the therapeutic drug is toxic, which is often the case in systemically administered chemotherapy cancer treatment, such elevated dosages are undesirable due to negative side-effects and non-specific biological effects.

Unfortunately, the use of precursor compounds at elevated concentrations is often unavoidable, as the activated drug form is often difficult to synthesize, unstable toward typical storage or transport conditions, and/or difficult to handle or administer, thereby preventing or discouraging use of the active drug form directly.

Devices for artificially stimulating activation of therapeutic drugs are being actively researched in the field. Open-air electrochemical flow cells for oxidizing precursor compounds have been previously described (Boudreau et al., 2013, Can. J. Chem., 91:960-967 and Boudreau, J., Electrochemical Generation of Reactive Species and their Application as Chemotherapeutics, 2012, Thesis presented to The University of Guelph, each of which is herein incorporated by reference in its entirety); however, these flow cells were unsuitable for clinical application as they do not protect the user from exposure to the potentially toxic compounds being used; do not provide sterile conditions; do not protect electrical components from produced corrosive hydrogen and oxygen gas; and are intended for operation in a toxicological research laboratory fume hood using suitable personal protective equipment (PPE).

An alternative, additional, and/or improved device for activating precursor compounds to form active compounds is desirable.

SUMMARY OF INVENTION

Provided herein are devices for electrochemically activating a precursor compound to produce an active compound. Such devices include a sealed housing enclosing an electrochemical cell, thereby preventing exposure of the electrochemical cell contents to the environment and the user. The sealed housing may be configured with one or more gas release and/or liquid overflow ports, which may provide a measure of control over internal operating pressure. The configuration of the sealed housing and the electrochemical cell may increase safety and simplify operation by the end user. Devices described herein may be configured as an integrated, modular apparatus which may provide improved versatility and/or portability.

In certain embodiments, devices as described herein may be configured for injective activated drugs or prodrugs directly into a cancerous growth or other non-cancerous tissue or tumor, for treating or damaging the tissue, for example.

In an embodiment, there is provided herein a device for electrochemically activating a precursor compound through oxidation to produce an active compound, said device comprising:
an electrochemical reactor comprising
an electrochemical cell comprising an anode and a cathode housed in a shared compartment, the anode and the cathode forming an electrical circuit in the presence of an electrolyte solution; or an anode housed in an anode compartment, a cathode housed in a cathode compartment, and an optional semipermeable membrane separating the anode and cathode compartments, the anode and cathode forming an electrical circuit in the presence of an electrolyte solution; and
a sealed housing enclosing the electrochemical cell, the sealed housing including at least one precursor compound input in fluid communication with the anode compartment or the shared compartment for inputting a precursor compound to be activated, an active compound output in fluid communication with the anode compartment or the shared compartment for outputting an activated compound following electrochemical activation, and at least one gas release and/or liquid overflow port; and
a power supply for providing and controlling power to the electrochemical reactor.

In another embodiment of the above device, the device may further comprise an external casing housing the electrochemical reactor and the power supply.

In still another embodiment of the above device or devices, the electrochemical reactor and the power supply may be housed in separate compartments of the external casing to prevent exposure of the power supply to oxygen and/or hydrogen gas produced by the electrochemical cell.

In yet another embodiment of the above device or devices, the device may further comprise a user interface presented on the external casing of the device for monitoring status and/or controlling operation of the device.

In still another embodiment of the above device or devices, the external casing of the device may comprise an access port for accessing the electrochemical reactor housed therein.

In another embodiment of the above device or devices, the anode compartment may be substantially disposed within the cathode compartment.

In still another embodiment of the above device or devices, the cathode may comprise a coiled conductive member surrounding a central anode conductive member.

In yet another embodiment of the above device or devices, the precursor compound input may comprise a plurality of fenestrations formed in the sealed housing.

In still another embodiment of the above device or devices, the anode compartment may be substantially parallel to the cathode compartment.

In another embodiment of the above device or devices, the anode may comprise a plate-shape which is substantially parallel to the cathode.

In still another embodiment of the above device or devices, the cathode compartment may be substantially parallel to the anode compartment.

In yet another embodiment of the above device or devices, the cathode may comprise a plate-shape, and may be parallel to the anode.

In still another embodiment of the above device or devices, the gas release port may vent to the atmosphere.

In yet another embodiment of the above device or devices, the liquid overflow port may release to a sealed waste container.

In yet another embodiment of the above device or devices, the gas release port and the liquid overflow port may be combined in functionality and may release to a sealed waste container.

In another embodiment of the above device or devices, the device may further comprise a pump for drawing active compound out of the active compound output, for pushing precursor compound into the precursor compound input, or both. In certain embodiments, the pump may comprise a peristaltic pump, an intravenous infusion pump, a positive displacement pump, or a kinetic pump.

In yet another embodiment of the above device or devices, the at least one gas release and/or liquid overflow port may regulate the internal operating pressure of the electrochemical cell.

In another embodiment of the above device or devices, the at least one gas release and/or liquid overflow port may comprise a check valve to regulate an internal operating pressure of the electrochemical cell.

In still another embodiment of the above device or devices, the electrochemical cell may be a flow cell or a batch reactor.

In another embodiment of the above device or devices, the power supply may be a potentiostat or amperostat or both, providing electrical control over voltage, current, or both.

In still another embodiment of the above device or devices, the power supply may be configurable to reverse polarity of the direction of the electrical current to the anode and the cathode.

In yet another embodiment of the above device or devices, the electrolyte solution may comprise 25 mM sodium sulfate.

In another embodiment of the above device or devices, the electrolyte solution may comprise about 0.9% w/v sodium chloride, or a physiologically buffered saline solution.

In still another embodiment of the above device or devices, the device may further comprise a precursor compound reservoir in fluid communication with the precursor compound input.

In yet another embodiment of the above device or devices, the device may further comprise an active compound reservoir in fluid communication with the active compound output.

In another embodiment of the above device or devices, the device may further comprise one or more mounting members for mounting the device to a stand.

In another embodiment of the above device or devices, the electrochemical reactor may be user-replaceable.

In still another embodiment of the above device or devices, the anode may comprise an inactive anode material, and the cathode may comprise a titanium wire cathode.

In another embodiment of the above device or devices, the anode may comprise an active anode material, and the cathode may comprise a plate-shaped cathode.

In yet another embodiment of the above device or devices, the membrane may comprise semipermeable Vycor™ glass, a semipermeable glass, a dialysis membrane, or an esterified dialysis membrane.

In still another embodiment of the above device or devices, the precursor compound may comprise a chemotherapeutic agent.

In yet another embodiment of the above device or devices, the precursor compound may comprise cyclophosphamide, acetaminophen, or another pharmaceutical compound which undergoes oxidative (or reductive, where the device is configured for reduction of the precursor compound) bioactivation by P450 enzymes.

In still another embodiment of the above device or devices, the device may further comprise an interface for controlling the voltage or current supplied by the power supply to the electrochemical cell.

In another embodiment, there is provided herein a method of electrochemically activating a precursor compound through oxidation to produce an active compound, said method comprising:
  inputting the precursor compound into a device as defined above;
  operating the device to electrochemically activate the precursor compound to produce the active compound; and
  outputting the activated compound from the device.

In another embodiment, there is provided herein a use of the device as defined above for electrochemically activating a precursor compound through oxidation to produce an active compound.

In another embodiment of the method or use above, the precursor compound may comprise a chemotherapeutic agent and the active compound may mimic a therapeutically active metabolite generated by in vivo biological processing of the chemotherapeutic agent.

In another embodiment, there is provided herein an electrochemical reactor comprising:
  an electrochemical cell comprising an anode and a cathode housed in a shared compartment, the anode and the cathode forming an electrical circuit in the presence of an electrolyte solution; or an anode housed in an anode compartment, a cathode housed in a cathode compartment, and a semipermeable membrane separating the anode and cathode compartments, the anode and cathode forming an electrical circuit in the presence of an electrolyte solution; and
  a sealed housing enclosing the electrochemical cell, the sealed housing including at least one precursor compound input in fluid communication with the anode compartment, or shared compartment, for inputting a precursor compound to be activated, an active compound output in fluid communication with the anode compartment, or shared compartment, for outputting an activated compound following electrochemical activation, and at least one gas release and/or liquid overflow port.

In yet another embodiment, there is provided herein a device for electrochemically activating a precursor compound through reduction to produce an active compound, said device comprising:

an electrochemical reactor comprising
an electrochemical cell comprising an anode and a cathode housed in a shared compartment, the anode and the cathode forming an electrical circuit in the presence of an electrolyte solution; or an anode housed in an anode compartment, a cathode housed in a cathode compartment, and a semipermeable membrane separating the anode and cathode compartments, the anode and cathode forming an electrical circuit in the presence of an electrolyte solution; and
a sealed housing enclosing the electrochemical cell, the sealed housing including at least one precursor compound input in fluid communication with the cathode compartment, or the shared compartment, for inputting a precursor compound to be activated, an active compound output in fluid communication with the cathode compartment, or the shared compartment, for outputting an activated compound following electrochemical activation, and at least one gas release and/or liquid overflow port; and
a power supply for providing power to the electrochemical reactor. In another embodiment of the above device, the device may further comprise an interface for controlling the voltage or current supplied by the power supply to the electrochemical cell.

In another embodiment, there is provided herein a method of electrochemically activating a precursor compound through reduction to produce an active compound, said method comprising:

inputting the precursor compound into a device as defined above;
operating the device to electrochemically activate the precursor compound to produce the active compound; and
outputting the activated compound from the device.

In still another embodiment, there is provided herein a use of the device as defined above for electrochemically activating a precursor compound through reduction to produce an active compound.

In still another embodiment of the above method or use, the precursor compound may be a chemotherapeutic agent and the active compound may mimic a therapeutically active metabolite generated by in vivo biological processing of the chemotherapeutic agent.

In still another embodiment, there is provided herein an electrochemical reactor comprising:

an electrochemical cell comprising an anode and a cathode housed in a shared compartment, the anode and the cathode forming an electrical circuit in the presence of an electrolyte solution; or an anode housed in an anode compartment, a cathode housed in a cathode compartment, and a semipermeable membrane separating the anode and cathode compartments, the anode and cathode forming an electrical circuit in the presence of an electrolyte solution; and
a sealed housing enclosing the electrochemical cell, the sealed housing including at least one precursor compound input in fluid communication with the cathode compartment, or the shared compartment, for inputting a precursor compound to be activated, an active compound output in fluid communication with the cathode compartment, or the shared compartment, for outputting an activated compound following electrochemical activation, and at least one gas release and/or liquid overflow port.

In yet another embodiment, there is provided herein a use of a device as described herein, for supplying an active compound to an implanted microinfusion pump, implanted infusion port, or implanted catheter.

In still another embodiment, there is provided herein a method for supplying an active compound to an implanted microinfusion pump, implanted infusion port, or implanted catheter, the method comprising:

inputting a precursor compound into a device as described herein;
operating the device to electrochemically activate the precursor compound to produce the active compound; and
outputting the activated compound to the implanted microinfusion pump, implanted infusion port, or implanted catheter.

In yet another embodiment, there is provided herein a use of a device as described herein for supplying an active therapeutic compound to a subject in need of such active therapeutic compound. As will be understood, the therapeutic compound may be selected based on the disease or condition of the subject to be treated. By way of example, in certain embodiments, there is provided herein a use of a device as described herein for supplying an active anticancer compound to a subject in need thereof, the subject having cancer.

In still another embodiment, there is provided herein a method for supplying an active therapeutic compound to a subject in need thereof, the method comprising:

inputting a precursor compound into a device as described herein;
operating the device to electrochemically activate the precursor compound to produce the active therapeutic compound; and
administering the active therapeutic compound to the subject.

As will be understood, the therapeutic compound may be selected based on the disease or condition of the subject to be treated. By way of example, in certain embodiments, the active therapeutic compound may be an active anticancer compound, and the subject may be a subject having cancer.

BRIEF DESCRIPTION OF DRAWINGS

These and other features, aspects, and properties of the present invention will become better understood with regard to the following description and accompanying drawings, wherein:

FIGS. 16A-C depict yet another embodiment of a device for electrochemically activating a precursor compound as described herein. The device, depicted in (A), is being used in combination with a handheld applicator shown in (B) (also see FIG. 12), which is in direct fluid communication with the precursor compound reservoir, the electrochemical reactor, and external pump. The handheld applicator is being used to supply the activated compound to the tumour, as shown in (C). The activated compound is being pumped by the handheld device directly into the tumour.

DETAILED DESCRIPTION

Figure 1:
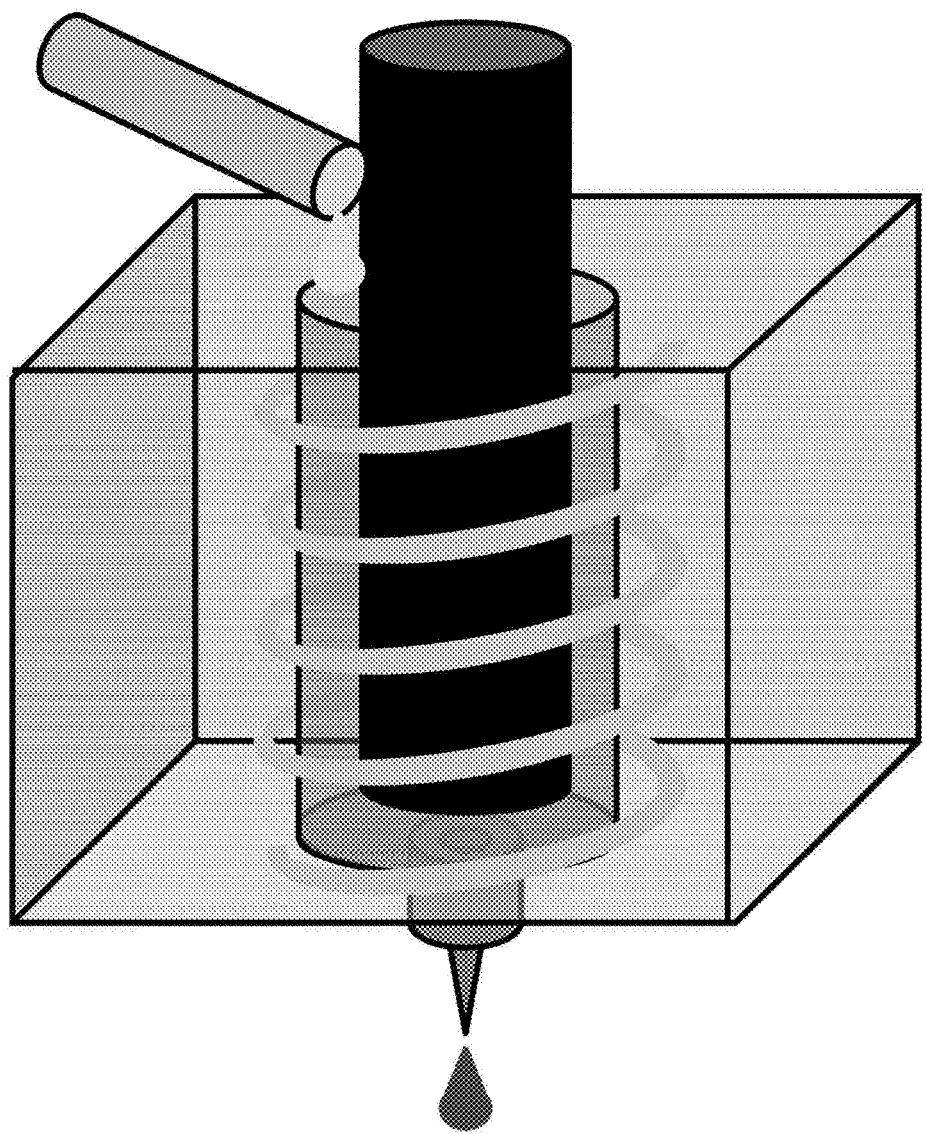
FIG. 1 shows an example of an open-air electrochemical flow cell used in a laboratory setting for testing electrochemical activation of certain precursor compounds.

Described herein are electrochemical reactor devices for electrochemically activating a precursor compound to produce an active compound. It will be appreciated that embodiments and examples are provided for illustrative purposes intended for those skilled in the art, and are not meant to be limiting in any way.

In an embodiment, there is provided herein a device for electrochemically activating a precursor compound to produce an active compound, said device comprising:

an electrochemical reactor comprising:
  an electrochemical cell comprising an anode and a cathode housed in a shared compartment, the anode and the cathode forming an electrical circuit in the presence of an electrolyte solution; or an anode housed in an anode compartment, a cathode housed in a cathode compartment, and a semipermeable membrane separating the anode and cathode compartments, the anode and cathode forming an electrical circuit in the presence of an electrolyte solution; and
  a sealed housing enclosing the electrochemical cell, the sealed housing including at least one precursor compound input in fluid communication with the anode compartment, or the shared compartment, for inputting precursor compound to be activated, an active compound output in fluid communication with the anode compartment, or the shared compartment, for outputting activated compound following electrochemical activation, and at least one gas release and/or liquid overflow port; and
a power supply for providing power to the electrochemical reactor.

Electrochemical activation of precursor compounds may occur as a result of an electrochemical reaction occurring in the electrochemical cell. As will be understood, electrochemical activation typically involves oxidation of the precursor compound to provide the active compound; however, this does not exclude the electrochemical activation occurring as a direct result of a reduction reaction of the precursor compound. As will be understood, voltage and/or current may be tailored to the particular entity to be activated. Each precursor may have one or more particular voltage and/or current values or ranges at which oxidation/reduction reaction may occur depending on the particular chemical structure. As well, as will be recognized, in certain examples it may be desirable to electrochemically reduce the precursor compound in order to form the active compound; in such cases the polarity of the anode and cathode may be reversed, or the precursor compound input and active compound outputs of the sealed housing may be placed in fluid communication with the cathode compartment, rather than the anode compartment. For the purposes of this discussion, the present device will be primarily described with reference to oxidation of the precursor compound, however it will be recognized that embodiments where the precursor compound is reduced are also contemplated and disclosed herein.

As will be understood, the device configuration may be matched with the precursor compound to be activated and the chemical properties thereof. In certain embodiments, if the device is configured with the anode and cathode housed in the shared compartment, the precursor compound may be one which does not substantially undergo redox cycling (reduction/oxidation cycling) in the shared compartment, which may otherwise limit production of active compound. In embodiments where such redox cycling of the precursor compound is a potential concern, a device configured with the anode and cathode housed in separate compartments as described herein may be preferred. The person of skill in the art having regard to the teachings herein will be able to select suitable device configurations for the particular precursor compound(s) and applications.

A precursor compound may comprise any suitable compound which may be converted through electrochemical activation to one or more desired or biologically active compounds or metabolites. Precursor compounds may include, for example, prodrugs which may be converted to their biologically active form(s) as a result of electrochemical treatment. Examples of precursor compounds may include, but are not limited to, organic and inorganic compounds such as: ascorbic acid (i.e. Vitamin C), oxazaphosphorines (e.g. ifosfamide, cyclophosphamide, trofosfamide), acetaminophen, hydroquinone, diclofenac, imipramine, lidocaine, parathione, fospropofol, ethanol, prednisone, and/or water. Examples of active compounds may include, but are not limited to, organic and inorganic compounds such as: phosphoramide mustard, benzoquinone, N-acetyl-p-benzoquinonimine (NAPQI), prednisolone, propofol, dopamine, phenobarbital, and/or radical metabolite species (including, but not limited to, hydroxyl radicals).

In certain embodiments, the precursor compound may comprise a chemotherapeutic agent, and the active compound may comprise a singular compound or set of compounds which mimic or are substantially equivalent to a therapeutically active metabolite or molecule generated by the in vivo biological processing of the chemotherapeutic agent (for example, a mixture of parent compound (cyclophosphamide) and products (phosphoramide mustard and acrolein).

In certain embodiments, the precursor compound may comprise a cyclophosphamide, acetaminophen, or another pharmaceutical compound which undergoes oxidative or reductive bioactivation by P450 enzymes as will be known to the person of skill in the art having regard to the teachings herein.

In certain embodiments, devices described herein may be used for electrochemically activating a therapeutic drug to produce an active form thereof which mimics, or is substantially equivalent to, a therapeutically active metabolite generated by the in vivo biological processing of the chemotherapeutic agent. It is contemplated that convenient production of such therapeutically active metabolites using devices described herein in a clinical setting may, in certain embodiments, allow for treatment of subjects with reduced dosages and/or may allow for more targeted or localized treatment strategies (i.e. local injection of active compound rather than systemic administration of precursor compound).

In certain embodiments, it is contemplated that devices described herein may be used to substantially mimic certain biological enzymatic processes, such as cytochrome P450 processing, in an ex vivo manner, which may allow for greater precision, control, predictability, and/or reproducibility. As well, it is contemplated that using an ex situ approach may reduce burden on the body's healthy cells, tissues, and metabolic machinery.

It will be understood that devices as described herein are not limited to clinical therapeutic applications, and may also, or alternatively, be of interest in biomedical; veterinary; drug discovery; and/or pharmaceutical research applications.

In certain embodiments, the precursor compound may be dissolved or mixed in solvent or diluent for introduction to the electrochemical reactor. In certain embodiments, the precursor compound may be dissolved or mixed with a suitable conductive medium, such as an electrolyte solution or gel. The solvent or diluent may be selected to suit the particular application. Where a subject is to be treated with the active compound following activation, the solvent or diluent may be selected so as to be compatible with the subject, thereby avoiding need for purification following activation by the devices described herein.

Examples of electrolytes may include, but are not limited to, organic and/or inorganic salts of: chloride, perchlorate, sulfate, sulfite, hydrogen phosphate, phosphate, hydroxide, nitrate, nitrite, hydrogen carbonate, carbonate, ascorbate, citrate, acetate, and/or conductive organic and/or inorganic gels. In certain embodiments, the electrolyte solution may comprise a sodium chloride electrolyte solution, or a physiologically buffered saline solution. In certain further embodiments, the electrolyte solution may comprise, for example, a 0.9% w/v sodium chloride solution.

Examples of solvents may include, but are not limited to water, methanol, ethanol, acetonitrile, or a combination thereof, or any other suitable polar or nonpolar protic solvent, for example. In certain embodiments, gels may act as a suitable media, such as for example 3% agarose gel, or a 1% polyacrylamide gel.

Electrochemical reactors for use in the devices described herein may comprise an electrochemical cell including an anode housed in an anode compartment, a cathode housed in a cathode compartment, and a semipermeable membrane separating the anode and cathode compartments, the anode and cathode forming an electrical circuit when in the presence of an electrolyte solution. In certain embodiments, it may be possible to operate the device with or without the semipermeable membrane, i.e. the semipermeable membrane may be optional. In order to provide a sterile environment and increase safety, electrochemical reactors described herein may further comprise a sealed housing enclosing the electrochemical cell, the sealed housing including at least one precursor compound input in fluid communication with the anode compartment (or cathode compartment, when reduction is desired) for inputting precursor compound to be activated, an active compound output in fluid communication with the anode compartment (or cathode compartment, where reduction is desired) for outputting activated compound following electrochemical activation, and at least one gas release and/or liquid overflow port.

The cathodes and anodes may include any suitable cathode and anode known to the person of skill in the art having regard to the teachings herein. By way of example, the anode may, in certain embodiments, comprise a chemically active or inactive anode. Suitable anode materials may include carbonaceous materials such as but not limited to graphite, graphene, coke, and/or boron-doped diamond; conductive ceramics such as Ebonex™; metals, amalgams, or metal oxides of periodic elements such as copper, tin, iron, silver, gold, ruthenium, iridium, tungsten, and/or titanium; or conductive organic and/or inorganic gels. The cathode may, in certain embodiments, comprise carbonaceous materials such as but not limited to graphite, graphene, coke, and/or boron-doped diamond; conductive ceramics such as Ebonex™; metals, amalgams, or metal oxides of periodic elements such as copper, tin, iron, silver, gold, ruthenium, iridium, tungsten, and/or titanium. In certain embodiments, the electrode(s) (i.e. the cathode, anode, or both) may comprise a coiled wire, plate, or cylindrically configured conductive member. In certain embodiments, the cathode may comprise a cylindrically configured conductive member surrounding, or adjacent to, a central anode conductive member. In certain embodiments, the cathode may comprise a coiled conductive member surrounding a central anode conductive member. As well, in certain embodiments, the anode compartment may be substantially disposed within the cathode compartment. In certain embodiments, the electrochemical cell may use an active or inactive electrode as either an anode or cathode. In certain embodiments, the anode may comprise an active anode material, and the cathode may comprise a plate-shaped cathode, for example.

In certain embodiments of the devices described herein, the anode compartment may be substantially parallel to the cathode compartment. In certain embodiments, the anode may comprise a plate-shape, which may be substantially parallel to the cathode. In certain embodiments, the cathode may comprise a plate-shape, and may be parallel to the anode.

The semipermeable membrane may include any suitable semipermeable membrane known to the person of skill in the art having regard to the teachings herein. By way of example, the membrane may comprise any suitable semipermeable membrane including, but not limited to, materials such as glass, polymeric resins or hydrogels, naturally or artificially derived polymer gels such as polyacrylamide, starch, cellulose esters, agarose, methylcellulose, hyaluronan, ionic gels, or any suitable technology including or derived from such materials such as Vycor™ glass tubing, dialysis membranes, cellulose ester membranes, or Spectra/Por™ Float-A-Lyzer™, among others.

The electrolyte solution may be provided with the electrochemical reactor, or may be subsequently added prior to use of the electrochemical reactor. The electrolyte solution may comprise any suitable electrolyte solution known to the person of skill in the art having regard to the teachings herein. By way of example, the electrolyte solution may comprise a sodium sulfate solution, such as a 25 mM sodium sulfate solution. Other electrolyte solution examples may include any suitable concentration of solvent and electrolyte which is capable of conducting an electrical current, such as 5-500 mM aqueous solutions of organic or inorganic ionic salts of: chloride, perchlorate, sulfate, sulfite, hydrogen phosphate, phosphate, hydroxide, nitrate, nitrite, hydrogen carbonate, carbonate, ascorbate, citrate, and/or acetate. Suitable examples of solvent may include water, methanol, ethanol, acetonitrile, any combination thereof, or any other suitable polar or nonpolar aprotic solvent. In certain embodiments, the electrolyte solution may be an aqueous electrolyte solution. Where a subject is to be treated with the active compound following activation, the electrolyte solution may be selected so as to be compatible with the subject, thereby avoiding need for purification following activation by the devices described herein. Solutions for medical purposes (i.e. injection into a living subject) may be adapted to be compatible with biological processes, for example, a pH buffered or unbuffered solution such as phosphate buffered saline (0.9% NaCl), or unbuffered saline solution (0.9% NaCl) may be used to dissolve the prodrug. In certain embodiments, the electrolyte solution may comprise a sodium chloride electrolyte solution, or a physiologically buffered saline solution. In certain further embodiments, the electrolyte solution may comprise, for example, a 0.9% w/v sodium chloride solution.

As will be understood, the electrochemical reactors described herein may be configured as either a flow cell or a batch reactor operating with or without a semipermeable dividing membrane. For the purposes of this discussion, the electrochemical reactors will be primarily described with regard to divided flow cell configurations; however, batch reactor configurations and undivided configurations are also contemplated herein.

The sealed housing of the electrochemical reactors described herein may comprise any suitable sealed housing which substantially encloses and isolates the electrochemical cell from the surrounding environment. The sealed housing may comprise at least one precursor compound input in fluid communication with the anode compartment (or cathode compartment, where reduction is desired) for inputting precursor compound to be activated, an active compound output in fluid communication with the anode compartment (or cathode compartment, where reduction is desired) for outputting activated compound following electrochemical activation, and at least one gas release and/or liquid overflow port.

In certain embodiments, as a result of the sealed housing, the electrochemical reactor may be provided as a consumable and/or user-replaceable component for use with the devices described herein.

Suitable precursor compound inputs may include, for example, those comprising one or more fenestrations in the sealed housing allowing permeation of the precursor compound therethrough, and/or those comprising one or more channels, passages, or other orifices allowing precursor compound transfer therethrough. Precursor compound inputs may include a suitable liquid-tight coupling member, such as a septa or a luer fitting, for connection with a precursor compound reservoir or source.

In certain embodiments, the sealed housing may, or may not, further include a perforating apparatus for piercing a sealed drug vial to create a fluid communication between the electrochemical reactor/electrochemical cell and the drug vial containing precursor compound, or other precursor compound source. In certain embodiments, the perforating apparatus may comprise a needle, for example.

Suitable active compound outputs may include, for example, those comprising one or more fenestrations in the sealed housing allowing permeation of the active compound therethrough, and/or those comprising one or more channels, passages, or other orifices allowing active compound transfer therethrough. Active compound outputs may include a suitable liquid-tight coupling member, such as a septa or a luer fitting, for connection with an active compound reservoir, or for direct transfer from the electrochemical cell to a subject via, for example, an intravenous (IV) drip, direct injection, or other suitable administration method.

The at least one gas release and/or liquid overflow port of the sealed housing may comprise any suitable port, channel, valve, or other passage which allows produced electrolytic gases, hydrogen, and/or oxygen to escape from the reaction chamber, either to be captured by a gas trap or vented directly to the atmosphere. Placement and/or location of the gas release and liquid overflow ports may be located near the top of the sealed reaction chamber, and away from the solvent flow through the device, so as to not obstruct or impede prodrug activation and solvent exit from the cell. There may be at least two gas release and liquid overflow ports in certain embodiments, one located in the anode compartment and one located in the cathode compartment to address the evolution of oxygen and hydrogen gas, respectively, during operation. An example of a suitable liquid over flow port may include a small piece of tubing attached through a hole in the cathode chamber wall which freely allows for exit of gas and liquid material from the cathode chamber into a waste receptacle or compartment. In certain embodiments, the gas release port may vent gases produced in the electrochemical cell, such as hydrogen and/or oxygen, to the atmosphere. In certain embodiments, the liquid overflow port may release to a sealed waste container, protecting users from exposure thereto. In certain embodiments, the at least one gas release and/or liquid overflow port may comprise a check valve for regulating an internal operating pressure of the electrochemical cell.

In certain embodiments, flow rate through devices described herein may be controlled by gravity, one or more stopcocks or valves, or by using a pump. By way of example, flow of the device may be controlled by a peristaltic pump typically used to administer an IV solution to a patient.

In certain embodiments, the devices described herein may further comprise, or be connected with, or be integrated with, a pump for drawing active compound out of the active compound output, for pushing precursor compound into the precursor compound input, or both. In an embodiment, the device may comprise a peristaltic pump or other suitable intravenous (IV) delivery pump. In certain embodiments, the pump may be a peristaltic pump, an intravenous infusion pump, a positive displacement pump, or a kinetic pump, for example. In embodiments employing a pump, the at least one gas release and/or liquid overflow port of the devices described herein may serve to regulate/compensate the internal operating pressure of the electrochemical cell, preventing overpressure and protecting against collapse of the semi-permeable membrane due to suction from the pump during operation.

Power supplies for use with the electrochemical reactors described herein may include any suitable power supply known to the person of skill in the art having regard to the teachings herein which is suitable for providing power to the electrochemical reactor. By way of example, a power supply may include those comprising an electrical control interface and corresponding electrical components to calibrate and control amperage and voltage such as, for example, a potentiostat. In certain embodiments, the power supply may comprise a potentiostat, or an amperostat. For the purposes of these discussions, the power supply will be primarily described as a potentiostat, however it will be understood that current control (i.e. amperostat) configurations, or a combination thereof, are also contemplated herein. The power supply may, in certain examples, provide control over current polarity (i.e. direction of electrical current flow); mode of operation: potentiostatic or amperostatic; and/or the amount of current applied, in amps, and/or the amount of voltage applied, in volts.

In certain embodiments, the power supply may be configurable to reverse polarity of electrical current to the anode and the cathode. Reversal of the polarity may reverse action of the electrodes (i.e. the cathode may become an anode, and the anode may become a cathode) in certain configurations. In such embodiments, the devices may provide versatility, since they may be quickly/easily configurable between oxidation and reduction treatment modes for treating the precursor compound, allowing for the device to be tailored to the particular precursor compound and/or application of interest.

In certain embodiments, the devices described herein may further comprise an interface for controlling the voltage, current, or both, supplied by the power supply to the electrochemical cell.

In certain embodiments, the devices described herein may further comprise an external casing housing the electrochemical reactor and the power supply. In certain further embodiments, the electrochemical reactor and the power supply may be housed in separate compartments of the external casing, so as to prevent exposure of the power supply and related electrical components to potentially corrosive oxygen and/or hydrogen gas produced by the electrochemical cell. In certain embodiments, such separate compartments may be separated from one another by a dividing wall sealed with a gasket, for example. As well, in certain embodiments, the external casing of the device may comprise an access port for accessing the electrochemical reactor housed therein, allowing maintenance and/or exchange of the electrochemical reactor unit. In certain embodiments, the external casing may be provided with one or more mounting members for mounting the device to a stand, surface, other supporting structure, or a robotic arm.

In certain embodiments, the external casing may comprise a substantially water-proof and/or corrosion resistant casing which may, in certain embodiments, facilitate sterilization of the device prior to use. As well, the external casing may provide protection and limit user exposure in the event of leaks and/or malfunction. The casing may also act as a light barrier, protecting any light-sensitive compounds from light exposure.

In certain embodiments, devices described herein may further comprise a user interface presented on the external casing of the device for monitoring status and/or controlling operation of the device. The user interface may allow user control over operation of the electrochemical reactor and/or the power supply, for example. Where a pump is provided, or integrated with the device, the user interface may allow control over operation of the pump.

In certain embodiments, devices described herein may further be integrated into existing surgical technologies, such as external intravenous pumps, refillable implantable infusion micropumps, implantable ports, catheter lines, and/or automated or semi-automated robotic arms for the delivery of precision-controlled administration (i.e. intratumor or interstitial space) of activated drugs. Said arms may be used for high throughput chemical screening practices using, for example, microchip screening arrays, or may be used to assist surgeons during operative surgeries (see FIGS. 11A-C for examples).

As will be understood, the devices described herein may, in certain embodiments, further comprise a precursor compound reservoir in fluid communication with the precursor compound input, an active compound reservoir in fluid communication with the active compound output, or both.

In certain embodiments, there is provided herein a substantially standalone device for producing or converting chemical compounds, through electrochemical oxidation or reduction of a precursor, into an altered chemical. The altered chemical may be more or less chemically and/or biologically reactive than the parent compound. Typically, such devices may be used for production of chemicals that have an increased reactivity with organic or inorganic chemicals associated with the life sciences.

In yet another embodiment, there is provided herein a modular attachment for inclusion in a suite of medical or surgical tools which may include, for example, a hands-free positioning and/or imaging device (i.e., having automated or semi-automated arms; robotic arms) used in precision tasks (e.g., Synaptive Medical's BrightMatter™ Drive) including, but are not limited to, high-precision surgeries, or high-throughput or volume drug screening. Such modular attachments may be used to produce or convert chemical compounds, through electrochemical oxidation or reduction of a precursor, into an altered chemical. The altered chemical may be more or less chemically and/or biologically reactive than the parent or precursor compound. Typically such modular attachment devices may be used for the production of chemicals that have an increased reactivity with organic or inorganic chemicals associated with the life sciences.

In certain embodiments, there is provided herein a use of a device as described herein for supplying an active compound to a subject in need thereof, either directly or via an implanted microinfusion pump, implanted infusion port, or an implanted catheter, for example.

In still another embodiment, there is provided herein a method of supplying an active compound to a subject in need thereof, either directly or via an implanted microinfusion pump, implanted infusion port, or implanted catheter, for example, the method comprising:

inputting a precursor compound into a device as described herein;

operating the device to electrochemically activate the precursor compound to produce the active compound; and outputting the activated compound to the subject, either directly, or via an implanted microinfusion pump, implanted infusion port, or implanted catheter, for example.

In yet another embodiment, there is provided herein a use of a device as described herein for supplying an active therapeutic compound to a subject in need of such active therapeutic compound. As will be understood, the therapeutic compound may be selected based on the disease or condition of the subject to be treated. By way of example, in certain embodiments, there is provided herein a use of a device as described herein for supplying an active anticancer compound to a subject in need thereof, the subject having cancer.

In still another embodiment, there is provided herein a method for supplying an active therapeutic compound to a subject in need thereof, the method comprising:

inputting a precursor compound into a device as described herein;

operating the device to electrochemically activate the precursor compound to produce the active therapeutic compound; and administering the active therapeutic compound to the subject.

As will be understood, the therapeutic compound may be selected based on the disease or condition of the subject to be treated. By way of example, in certain embodiments, the active therapeutic compound may be an active anticancer compound, and the subject may be a subject having cancer.

Illustrative embodiments will now be described by way of example. It will be understood to persons skilled in the art that a number of variations and modifications can be made to the following examples without departing from the scope of the invention as defined in the claims. The following examples are intended for the person of skill in the art, and are not intended to be limiting in any way.

Example 1—Sealed, User-Replaceable Electrochemical Reactor

An example of a sealed, user-replaceable electrochemical reactor for use in devices described herein is described in further detail below with reference to FIGS. 2A and 2B.

In the illustrated example, a sealed, user-replaceable, and modular electrochemical reactor (2) (see FIG. 2) is provided which comprises an electrochemical cell (3) including an anode (4) housed in an anode compartment (5), a cathode (6) housed in a cathode compartment (7), and a semipermeable membrane (8) separating the anode and cathode compartments, the anode and cathode forming an electrical circuit in the presence of an electrolyte solution (9). The sealed, user-replaceable, and modular electrochemical reactor (2) further comprises a sealed housing (10) enclosing the electrochemical cell, the sealed housing including at least one precursor compound input (11) in fluid communication with the anode compartment for inputting precursor compound to be activated, an active compound output (12) in fluid communication with the anode compartment for outputting activated compound following electrochemical activation (which, in this example, is via oxidation), and at least one gas release and/or liquid overflow port (elements (13)).

In the illustrated example, the anode compartment (5) is substantially disposed within the cathode compartment (7), and the cathode (6) comprises a coiled conductive member surrounding a central anode (4) conductive member. The anode comprises an inactive anode, and the cathode comprises a titanium wire cathode. The semi-permeable membrane (8) comprises a dialysis membrane.

The precursor compound input (11) of the illustrated electrochemical reactor (2) comprises a plurality of fenestrations (18) formed in the sealed housing, the gas release port (13) vents to the atmosphere, and the liquid overflow port (13) releases to a sealed waste container (not shown). The at least one gas release and/or liquid overflow port (elements (13)) regulate the internal operating pressure of the electrochemical cell in this example. As will be understood, the electrochemical cell (2) illustrated in this example is a flow cell.

In the illustrated example, the precursor compound input (11) includes a liquid-tight coupling member in the form of a luer fitting, for connection with a precursor compound reservoir or source. As well, the active compound output (12) includes a liquid-tight coupling member in the form of a luer fitting for connection with an active compound reservoir, or for direct transfer from the electrochemical cell to a subject via, for example, an intravenous (IV) drip.

Figure 2A:
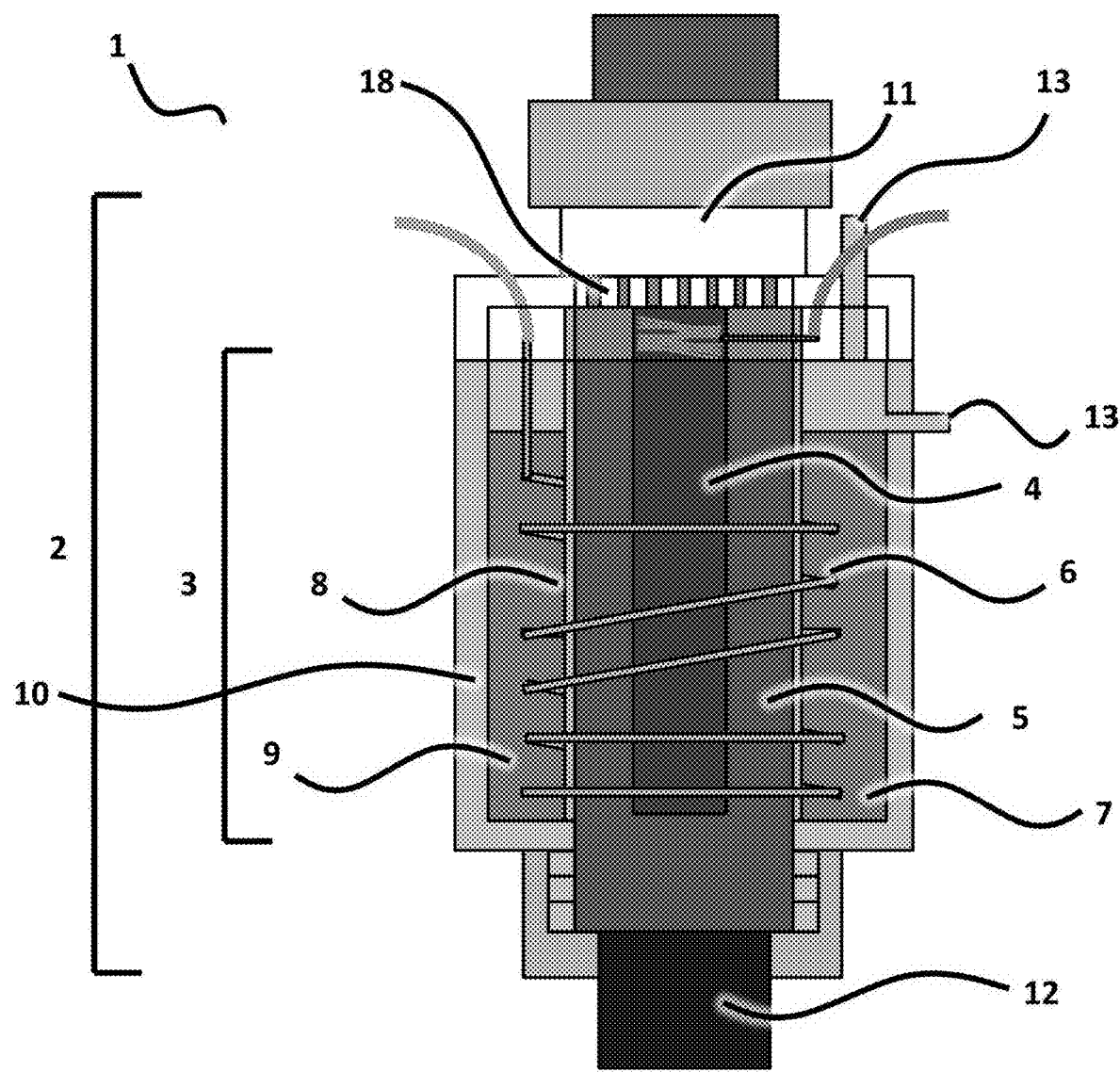
FIG. 2(A) shows a cross-sectional side view of an embodiment of electrochemical reactor as described herein.
Figure 2B:
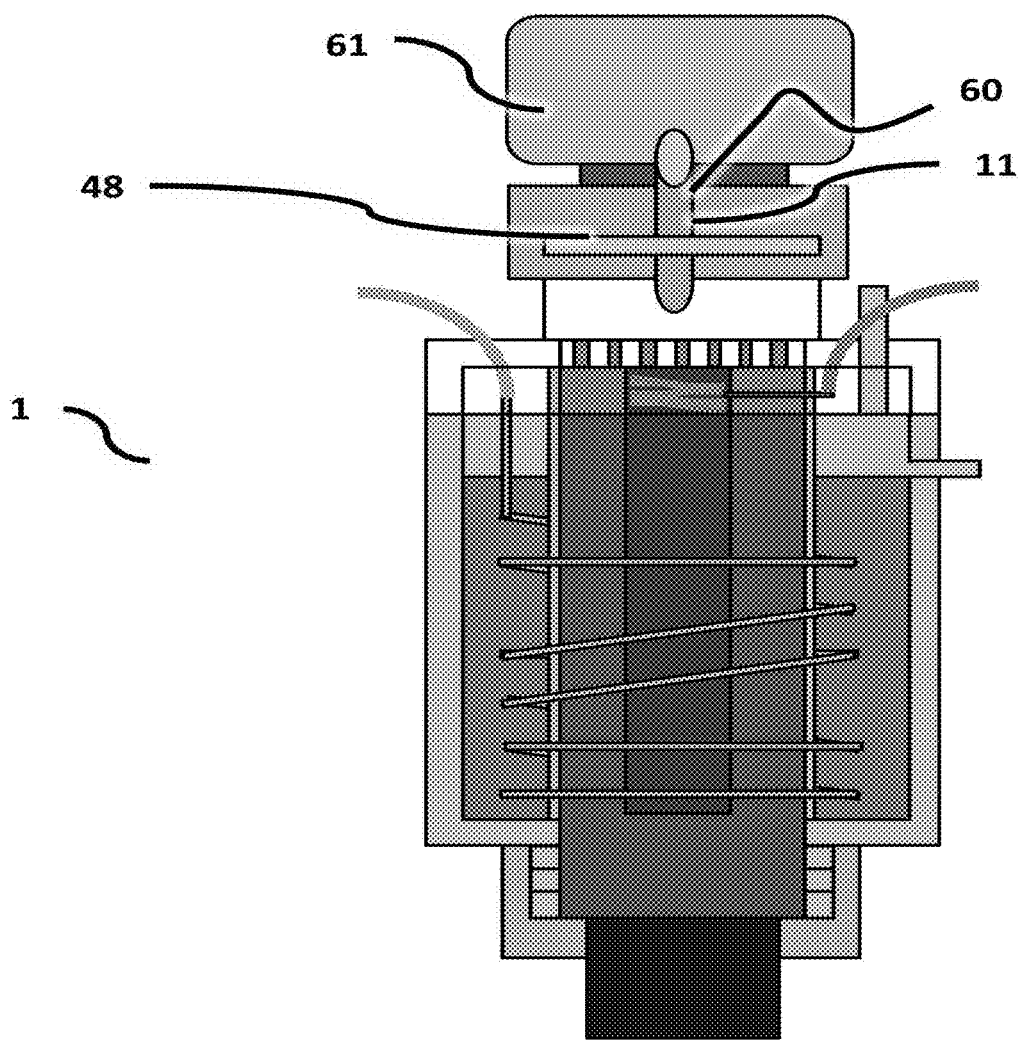
FIG. 2(B) shows the electrochemical reactor of FIG. 2(A) which is being used with a perforator apparatus as part of the precursor compound input (11), and having a precursor drug-containing vial with septum attached thereto, the perforating apparatus piercing the septum to access the precursor drug contained therein.
Figure 3:
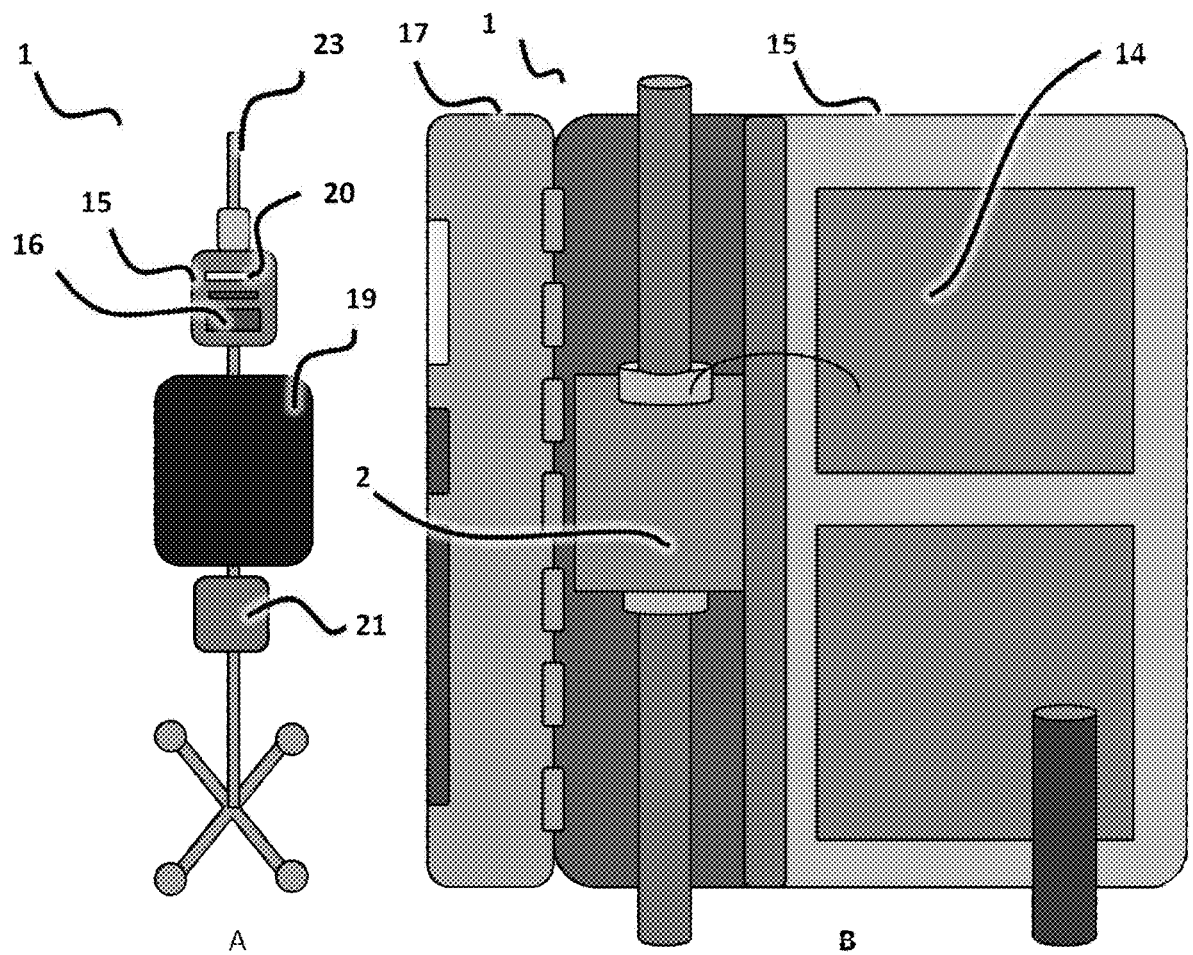
FIG. 3 shows a perspective view (A), and a side view taken in partial cross-section (B), of an embodiment of a device for electrochemically activating a precursor compound as described herein which includes the electrochemical reactor depicted in FIG. 2 and which further includes a peristaltic pump.
Figure 4:
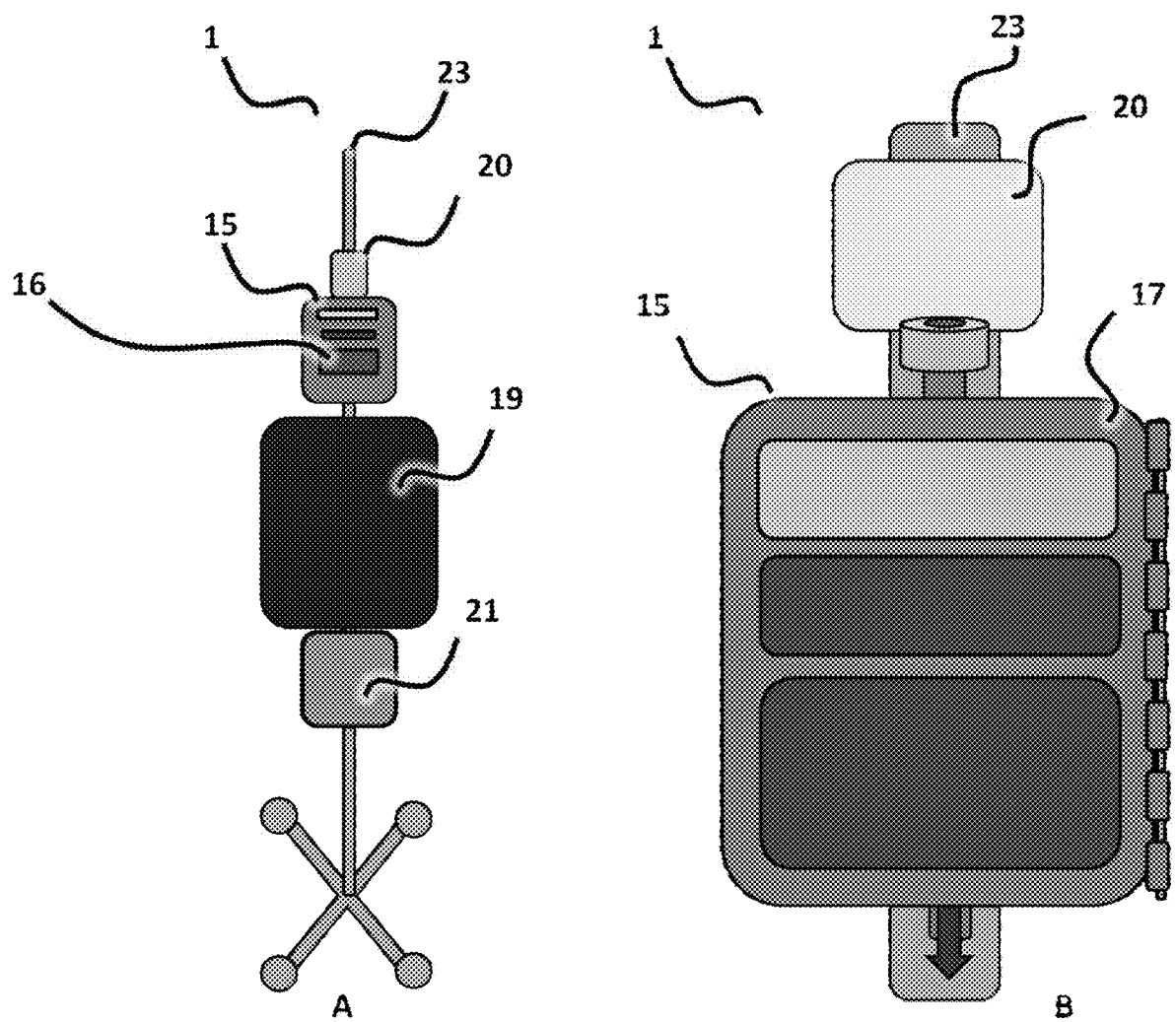
FIG. 4 shows a perspective view (A), and a front elevational view (B) of the device for electrochemically activating a precursor compound as depicted in FIG. 3, which further includes a precursor compound reservoir and an active compound reservoir.
Figure 5:
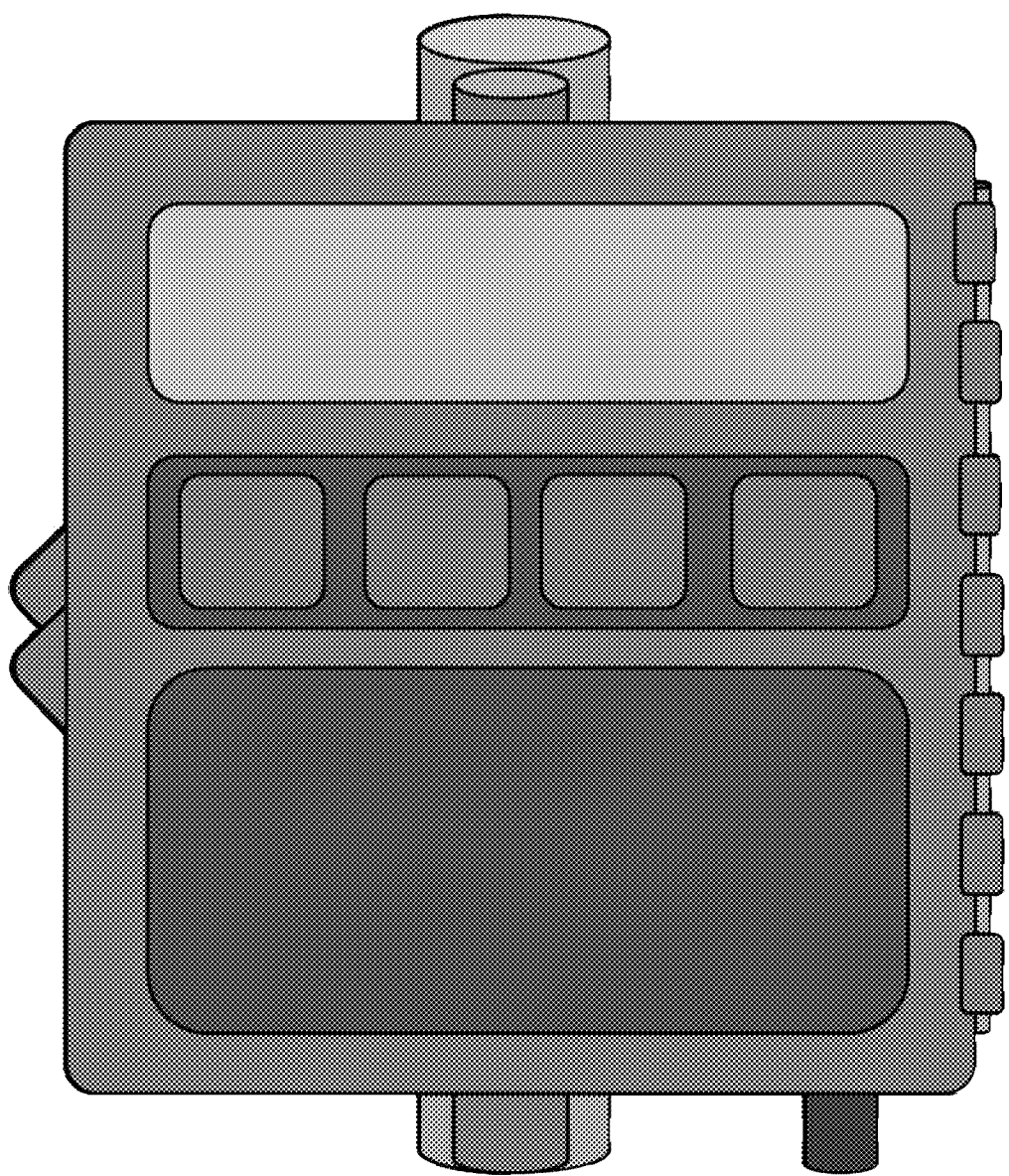
FIG. 5 shows a front view of the device for electrochemically activating a precursor compound as depicted in FIG. 3.
Figure 6:
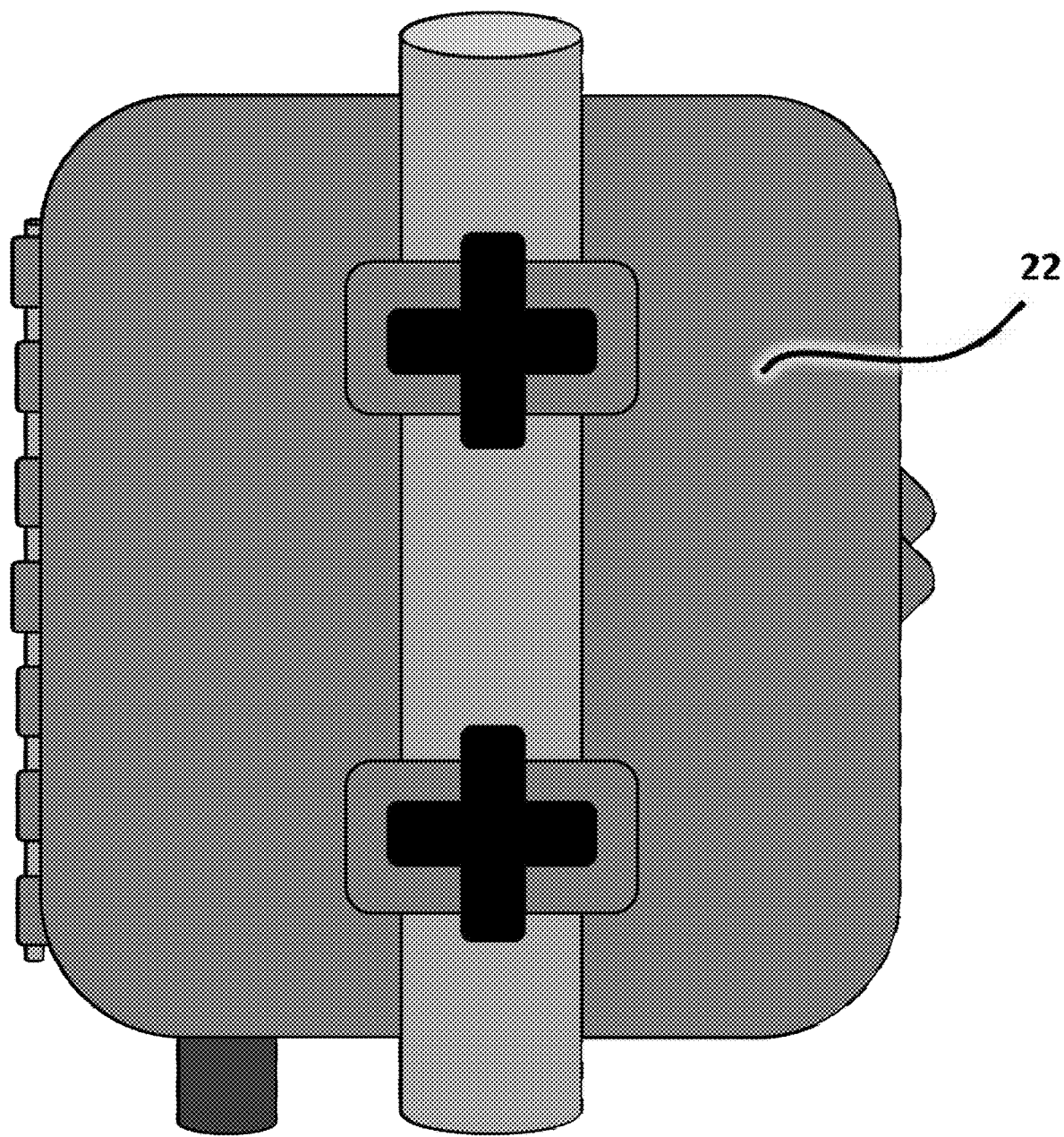
FIG. 6 shows a rear view of the device for electrochemically activating a precursor compound as depicted in FIG. 3.
Figure 7:
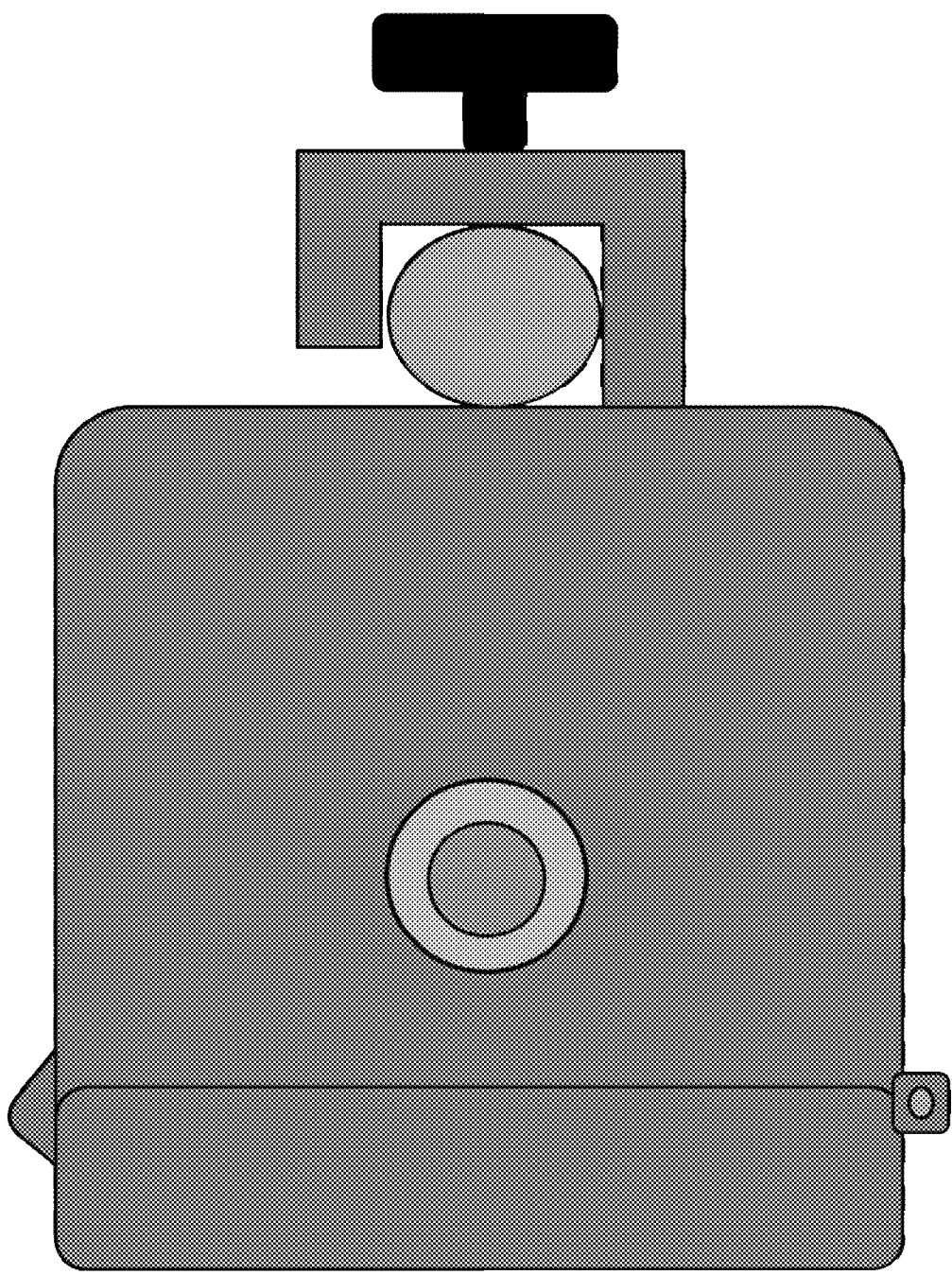
FIG. 7 shows a top view of the device for electrochemically activating a precursor compound as depicted in FIG. 3.
Figure 8:
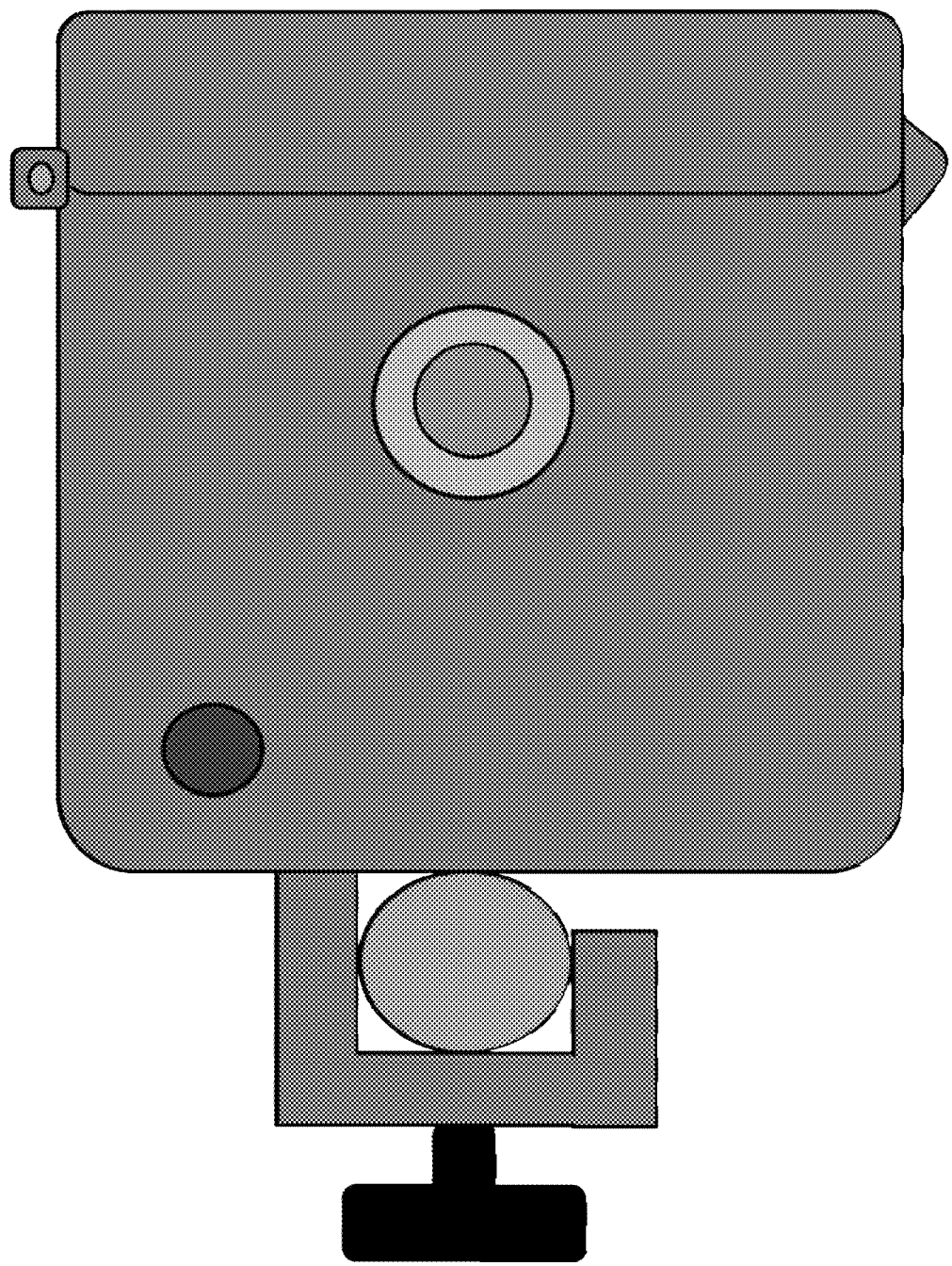
FIG. 8 shows a bottom view of the device for electrochemically activating a precursor compound as depicted in FIG. 3.
Figure 9:
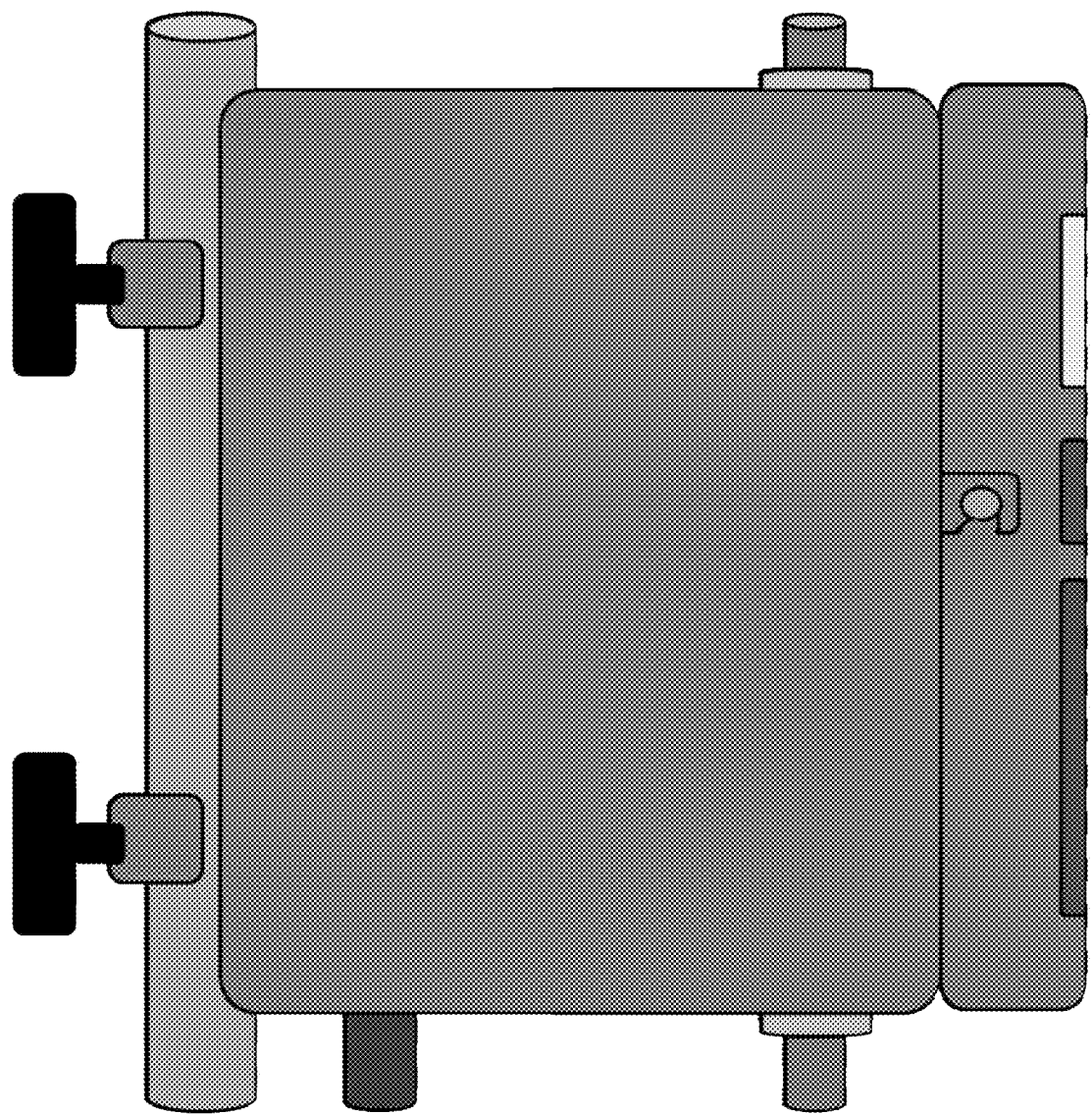
FIG. 9 shows a left side view of the device for electrochemically activating a precursor compound as depicted in FIG. 3.
Figure 10:
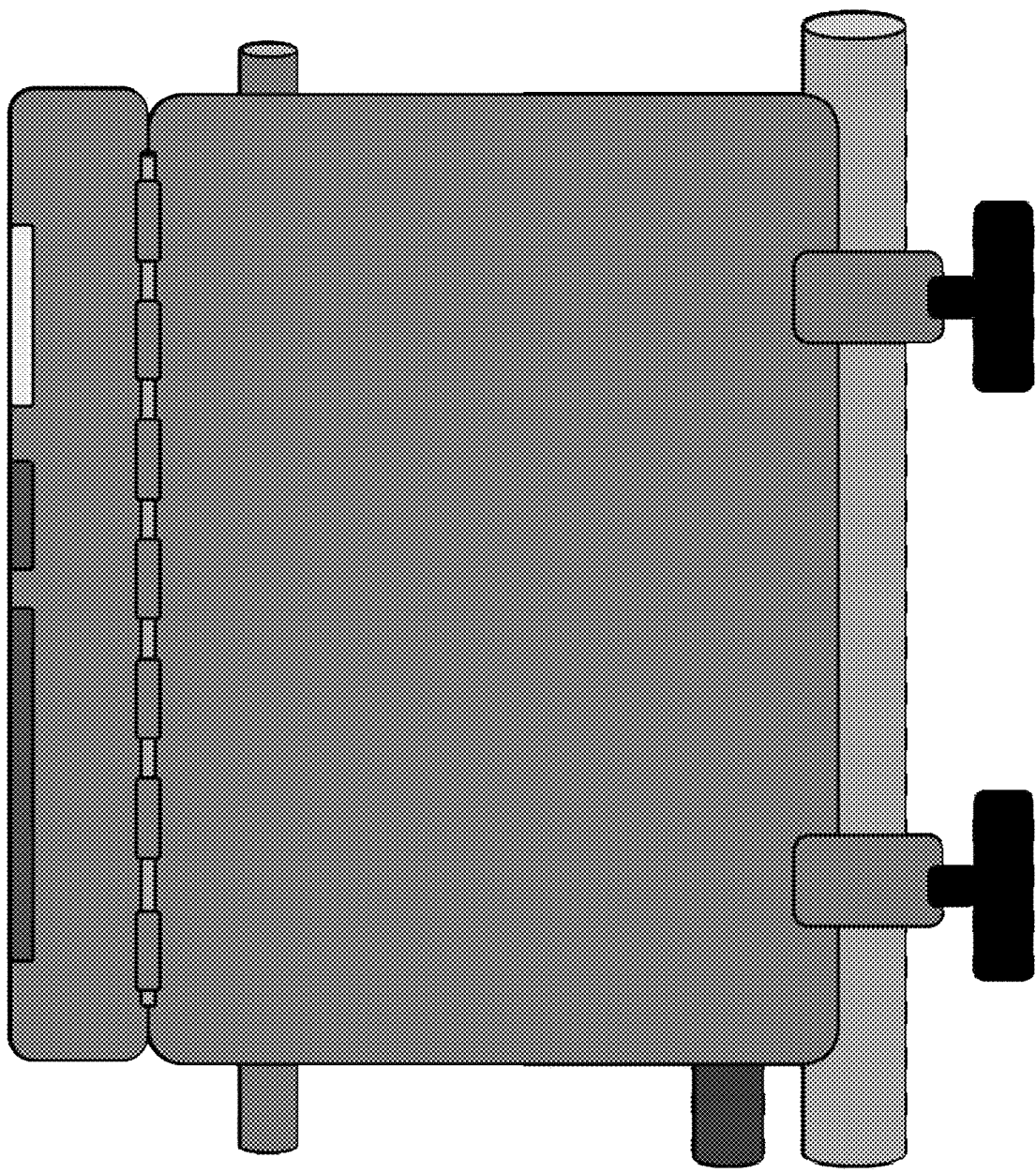
FIG. 10 shows a right side view of the device for electrochemically activating a precursor compound as depicted in FIG. 3.

FIG. 2(B) shows the electrochemical reactor of FIG. 2(A), which is being used with a perforator apparatus (60) as part of the precursor compound input (11), and having a precursor drug-containing vial (61) with septum (48) attached thereto, the perforating apparatus (60) piercing the septum to access the precursor drug contained therein.

Example 2—Integrated, Modular, Self-Contained Device for Electrochemically Activating a Precursor Compound An example of an integrated, modular, and self-contained device for electrochemically activating a precursor compound is described in further detail below with reference to FIGS. 3-11. The illustrated device comprises the electrochemical reactor depicted in FIG. 2 and described in Example 1 above.

In the illustrated example, an integrated, modular, and self-contained device (1) (see FIGS. 3A and 3B) for electrochemically activating a precursor compound is depicted. As shown in FIGS. 3A and 3B, the illustrated device (1) includes the electrochemical reactor (2) as depicted in FIG. 2 and described in Example 1 above, and a power supply

(14) for providing power and electrical control to the electrochemical reactor (2). In this example, the power supply is a potentiostat.

The illustrated device (1) further comprises an external casing (15) housing the electrochemical reactor (2) and the power supply (14). In this example, the electrochemical reactor (2) is housed in front of the power supply (14), allowing a user to inspect operation of the electrochemical reactor (2), perform maintenance thereon, and/or replace the electrochemical reactor (2). In the illustrated example, the electrochemical reactor (2) and the power supply (14) are housed in separate compartments of the external casing (15) to prevent exposure of the power supply to oxygen and/or hydrogen gas produced by the electrochemical cell.

The depicted device (1) further comprises a user interface (16) presented on the external casing of the device for monitoring status and/or controlling operation of the device. In the illustrated example, the user interface (16) is disposed on a hinged access port (17) for accessing the electrochemical reactor (2) housed within the external casing (15), allowing a user to inspect operation of the electrochemical reactor (2), perform maintenance thereon, and/or to replace the user-replaceable electrochemical reactor (2).

The illustrated device (1) further comprises a pump (19) for drawing active compound out of the active compound output of the electrochemical reactor (2). In this example, the pump is a peristaltic pump.

In the depicted device (1), the device further comprises a precursor compound reservoir (20) in fluid communication with the precursor compound input, and an active compound reservoir (21) in fluid communication with the active compound output. The illustrated device further comprises one or more mounting members (22) (see FIG. 6) for mounting the device to an IV stand (23).

Figure 11A:
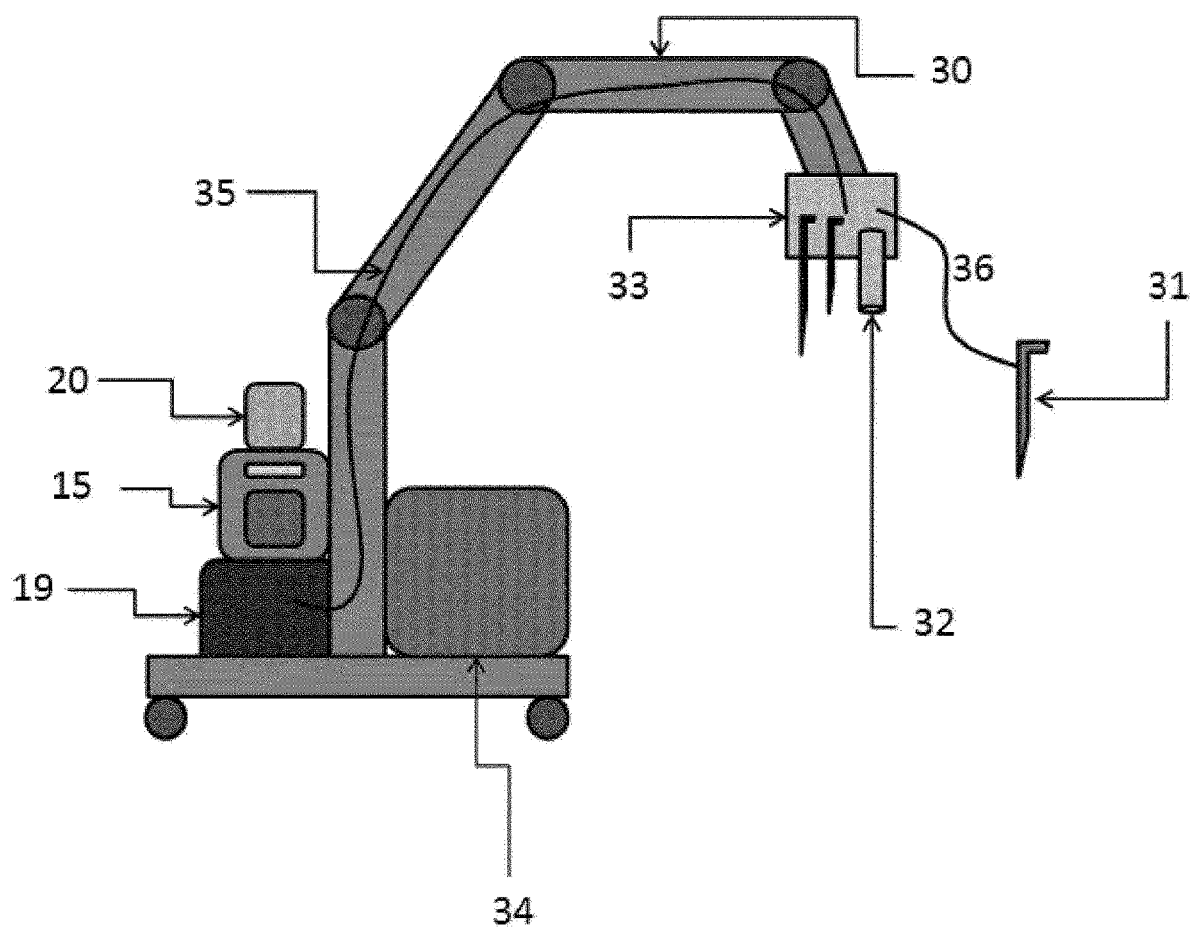
FIGS. 11A-C depict embodiments of devices for electrochemically activating a precursor compound as described herein, in combination with a semi-automated arm for high-precision surgery, the arm having integrated optical devices and/or surgical equipment (e.g. a Synaptive Medical BrightMatter™ Drive).
Figure 11B:
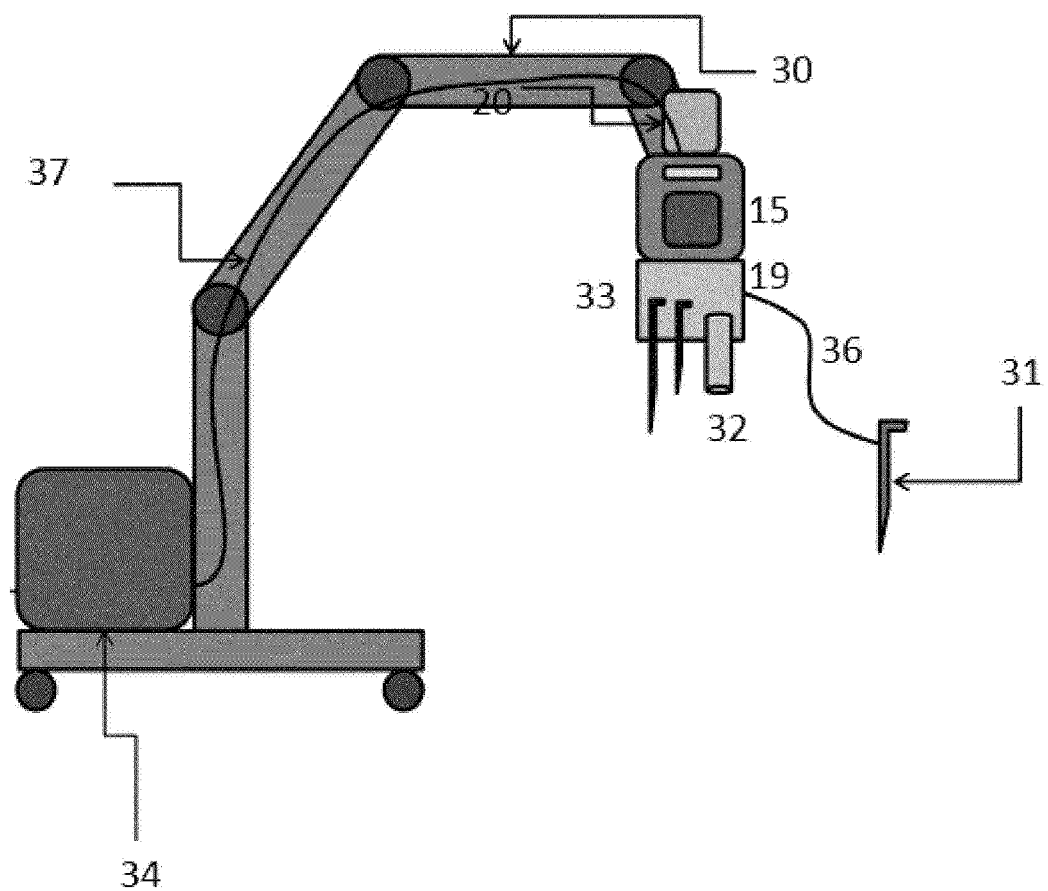
Figure 11C:
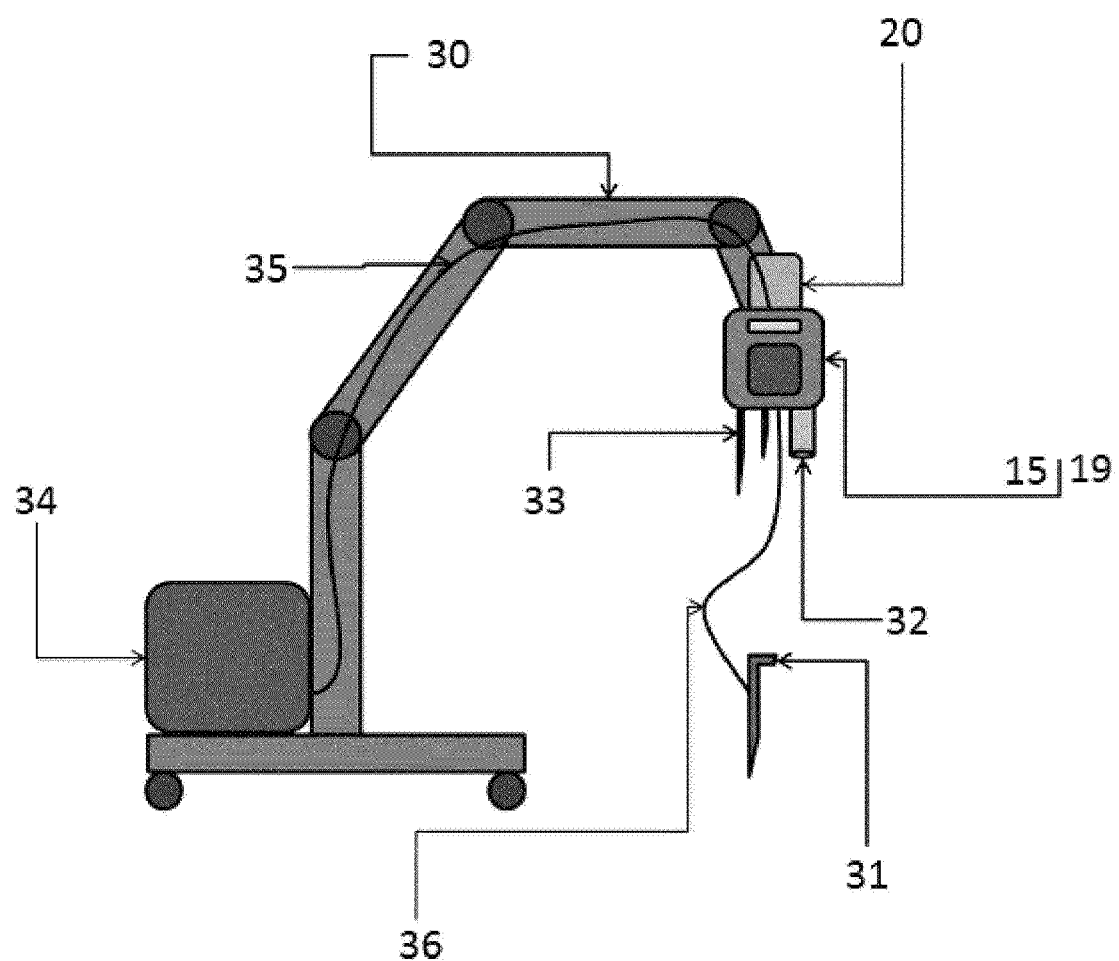

In certain additional or alternative embodiments, the mounting members (22) (see FIG. 6) may be for mounting the device to an automated or semi-automated arm (30), as depicted in FIGS. 11A-C. In certain examples, the housing of the reactor and the potentiostat may further be incorporated with the housing of the robotic arm (30), including electronic housing for robotic arm automation (34) and optionally equipped with surgical tools (33) (i.e. scalpel, syringe), optical/imaging equipment (32) (i.e. microscope, camera), and/or an injection-ready syringe or needle (31) supplied with activated prodrug via efflux tubing (36), so that effluent from the device (i.e. activated prodrug) may remain internal to the arm as it is transported from the proximal to distal end via an activated prodrug fluid transport line (35) (see FIG. 11A). In another embodiment, as shown in FIG. 11B, electrical wiring (37) may be internal to the arm and connect the proximally located potentiostat, which is integrated with the electronic housing for automation (34) electrical controls, to the reaction chamber, prodrug reservoir, and surgical (33) and optical (32) equipment with which pump (19) is integrated. In still another embodiment related to that depicted in FIG. 11B, as shown in FIG. 11C, the reaction chamber, peristaltic pump, and optical and surgical equipment may be all integrated into the distal end of the arm.

In certain embodiments, it is contemplated that the robotic arm may be controllable remotely by telerobotics. In certain embodiments, the device and/or robotic arm may have wireless and/or internet connectivity, allowing for telecommunications surgery applications. Such embodiments may be for use in performing surgery via telemedicine, and/or for remote assistance applications, for example.

FIGS. 4(A), 4(B), and 5-10 provide additional views of the device (1) depicted in FIGS. 3A and 3B.

In certain embodiments, the electrochemical reaction chamber (2) may be contained within a handheld device (65) (FIG. 12) which has fully incorporated a peristaltic pump (19), electronic voltage controller/regulator (38), and user interface (16) for controlling current and/or voltage provided by power supply (14), as described herein. Additionally, the configuration represented by the illustration in FIG. 12 includes a pressure sensitive trigger (39), or switch, which the operator of the hand held gun (65) is able to use to control the rate of flow generated by the peristaltic pump (19). The electronic interface (16) is able to set the rate of electrical potential and mode of operation (potentiostatic or amperostatic) and is directly connected to the electrochemical controller (38). The electronic controller (38) acts as a centralized communicator between the interface (16), the reaction chamber (i.e. electrochemical reactor (2)), the peristaltic pump (19), the trigger (39), and the power supply (14) (either battery, or cord). The depicted device includes an installed precursor compound reservoir (20), which may be user replaceable, and which in the depicted example is a standard 500 mg dose vial filled with electrolyte solution and precursor compound, which has been inverted, and placed over top of the gas release port (62) of the electrochemical reactor (2). The gas produced by the electrochemical reactor (2) is able to provide a back pressure to keep the solution flowing, and prevent a vacuum, which would otherwise cause a back suction into the precursor compound reservoir. The depicted handheld gun configuration includes a perforator (60), in the form of a needle, as part of the input (11), which punctures the septa of the precursor compound reservoir (20) vial and establishes fluid communication to the electrochemical cell. The output (12) outputs activated compound following electrochemical activation to an activated prodrug fluid transport line (35), through external casing (15) of the device, to surgical tool (33) which in this example comprises a biopsy needle allowing for injection of activated drug into a subject in need thereof.

Figure 12:
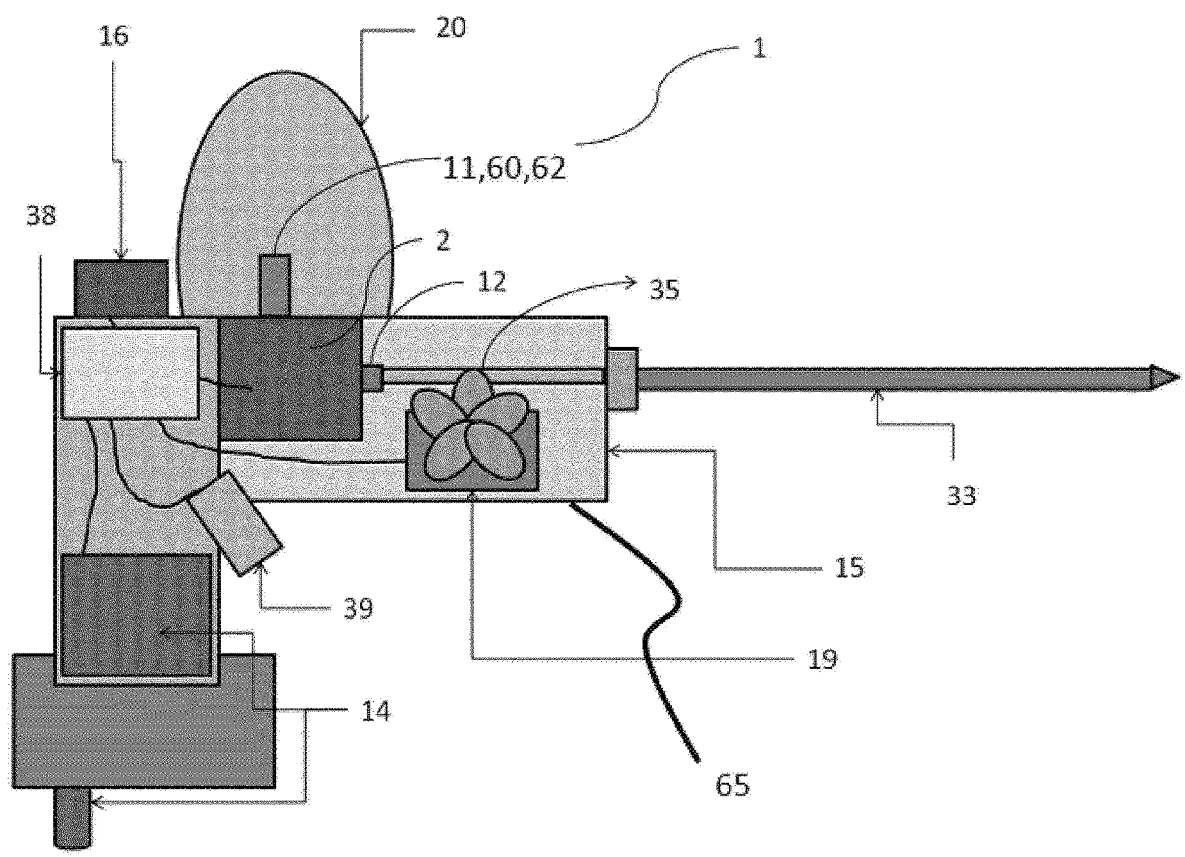
FIG. 12 depicts an embodiment of a device for electrochemically activating a precursor compound as described herein, embodied as a hand-held injector 'gun' for high-precision surgery.

In the embodiment depicted in FIG. 12, the device (1), which is in the form of a handheld device (65), includes an electrochemical reactor (2) which comprises a sealed housing enclosing an electrochemical cell, the sealed housing including at least one precursor compound input (11) in fluid communication with the anode compartment or the shared compartment of the electrochemical cell for inputting a precursor compound to be activated, an active compound output (12) in fluid communication with the anode compartment or the shared compartment of the electrochemical cell for outputting an activated compound following electrochemical activation, and at least one gas release and/or liquid overflow port (62). In the depicted embodiment, the sealed housing is integrated with the electrochemical cell, forming a single unit. As well be understood, in embodiments of devices as described herein, the sealed housed may be integrated with the electrochemical cell, or may be a separate component from the electrochemical cell.

In certain embodiments, the handheld device (65), or another device as described herein, may include an automatic dose metering feature, for applying a pre-determining dose to a subject in need thereof.

Figure 13:
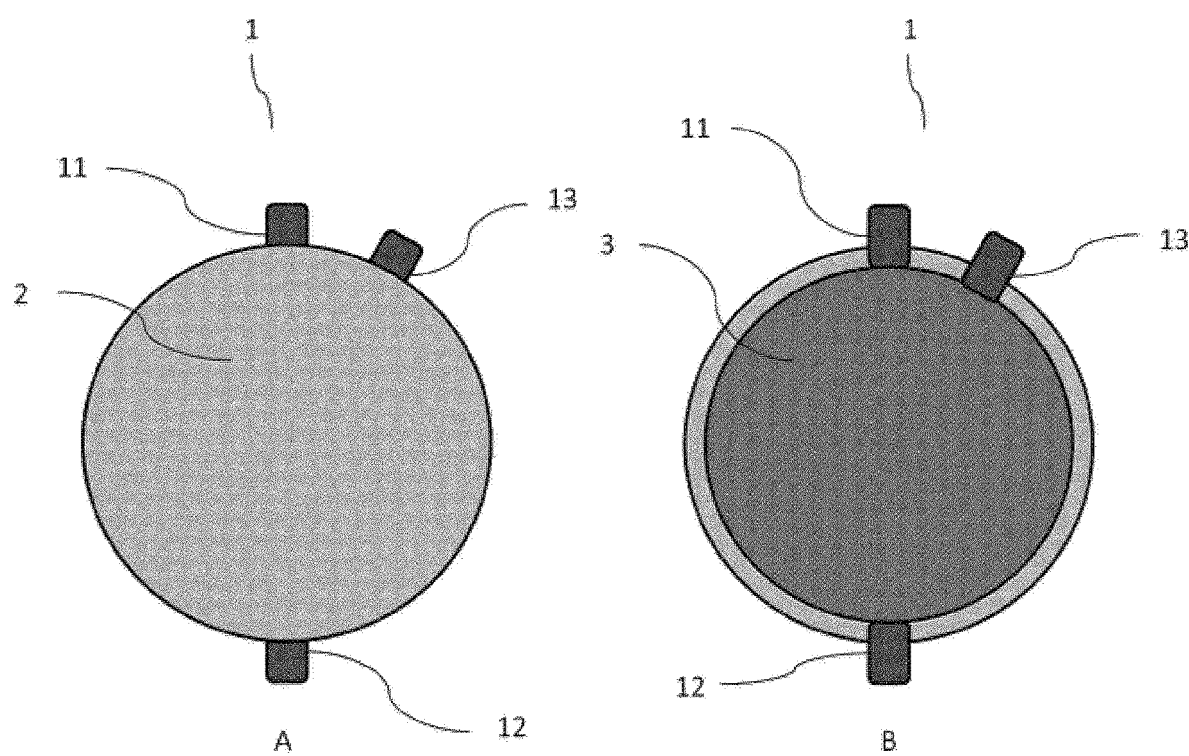
FIG. 13 shows a perspective view (A), and a side view taken in cross-section (B), of another embodiment of an electrochemical reactor for electrochemically activating a precursor compound as described herein.
Figure 14:
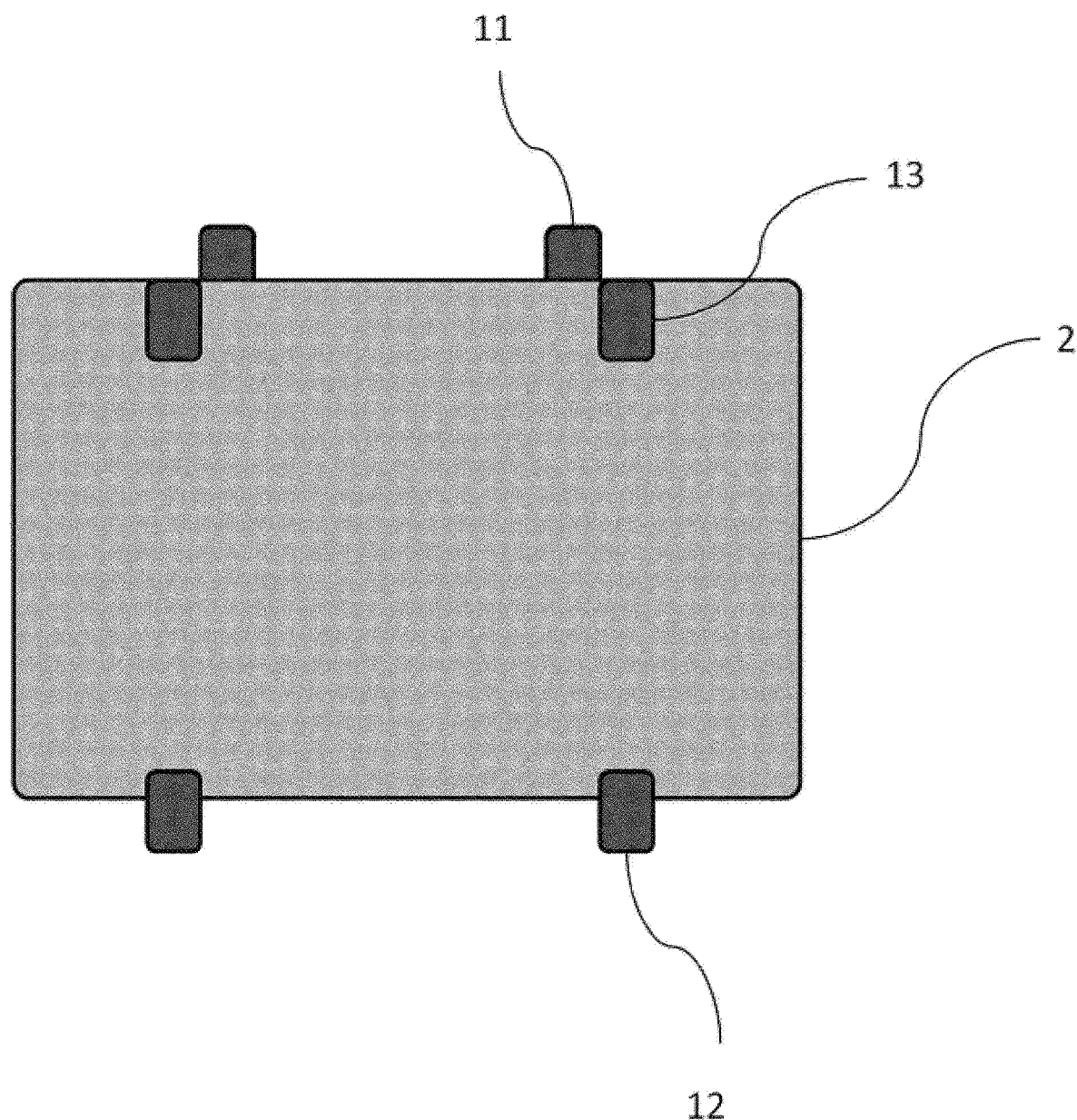
FIG. 14 shows a perspective view of an embodiment of an electrochemical reactor, as depicted in FIG. 13, for electrochemically activating a precursor compound as described herein.

FIG. 13 shows a perspective view (13A), and a side view taken in cross-section (13B), of another embodiment of an electrochemical reactor (2) for electrochemically activating a precursor compound as described herein. In FIG. 13A, the electrochemical reactor (2) includes a gas outlet port (i.e. gas release and/or liquid overflow) (13), an input port (11) in fluid communication with a prodrug reservoir, and an activated prodrug output port (12). In FIG. 13B, the electrochemical reactor (2) is shown in cross section, with the electrochemical cell (3) indicated. FIG. 14 shows a perspective view of the embodiment of the electrochemical reactor as depicted in FIG. 13.

In the embodiment shown in FIGS. 13 and 14, the electrochemical cell (3) has a parallel orientation which acts to increase electrode surface area and electrical current flowing between the anode and the cathode. In FIGS. 13 and 14 the gas outlet and the liquid overflow port has been combined into a single outlet/port (13). The precursor compound flows into the electrochemical cell (3) through the precursor compound input (11), resides in the electrochemical cell (3) for a period of time as a function of flow rate, is electrochemically acted upon by the electrodes (not shown, but residing within (3)), and then exits in an activated state via the fluid output (12). In FIGS. 13 and 14, electrochemical cell (3) has a vertical flow and parallel electron flow (i.e., current) alignment, and the physical shape of the cell (3) creates a significant increase in the retention time of the precursor containing fluid with the electrodes before exiting via the output, thus increasing precursor compound conversion. The configuration of the reaction chamber shown in FIGS. 13 and 14 may allow for the dimensional scaling of the size of the reactor. In FIG. 2 the electrochemical cell is shown to be vertically and concentrically oriented so that the alignment of the reaction chamber favours an increased flow speed of the prodrug containing fluid (i.e., fluid contact with the electrodes is comparatively reduced). In FIGS. 13 and 14, the electrochemical cell has plate-shaped disc-type electrodes, which are aligned parallel to each other and within substantial proximity to each other within the electrochemical cell (and, accordingly, their respective anode and cathode compartments are also aligned substantially parallel to each other), providing a large surface area for electrochemical reaction with precursor compound exposed thereto. The parallel alignment and electrode proximity is designed to optimize factors affecting mass transport of the chemical compound to the electrodes surface and current efficiency. Both reaction chamber configurations (compare FIGS. 2 and 13) are designed to provide different conditions in terms of flow speed and drug conversion.

Example 3—Use of Devices for Electrochemically Activating a Precursor Compound and Supplying Activated Drug to an Implanted Microinfusion Pump or Catheter, or for Direct Intratumor Injection An example of an integrated, modular, and self-contained device for electrochemically activating a precursor compound is described in further detail below with reference to FIGS. 15-17. The illustrated devices comprise an electrochemical reactor and device which is highly similar to that described in Examples 1 and 2 above.

Figure 15A:
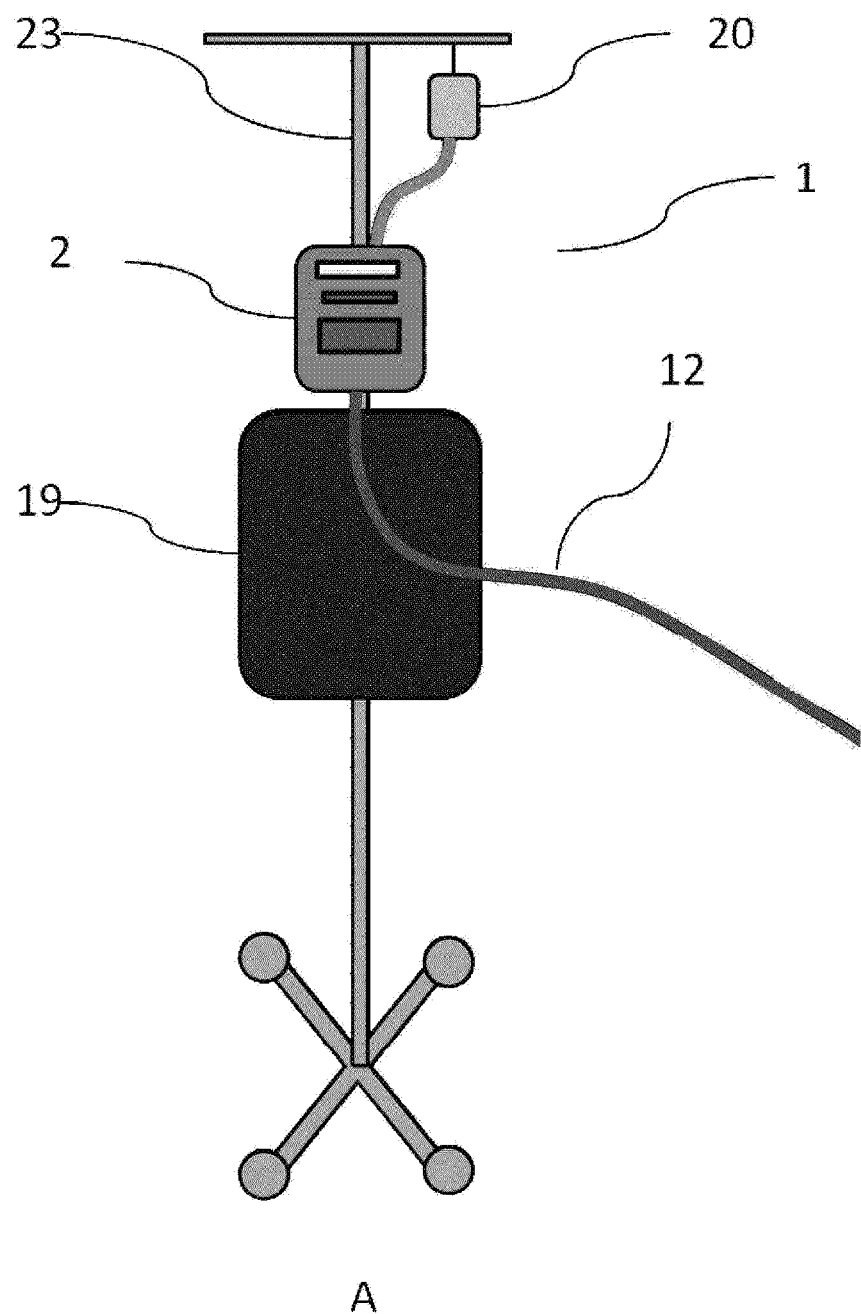
FIGS. 15A-C depict another embodiment of a device for electrochemically activating a precursor compound as described herein. The device, depicted in (A), is being used in combination with a subcutaneously implanted microinfusion pump, as shown in (B), which is in direct fluid communication with the precursor compound reservoir, the electrochemical reactor, and an external pump. The activated compound is pumped by the microinfusion pump directly into the tumour, as shown in (C)
Figure 15B:
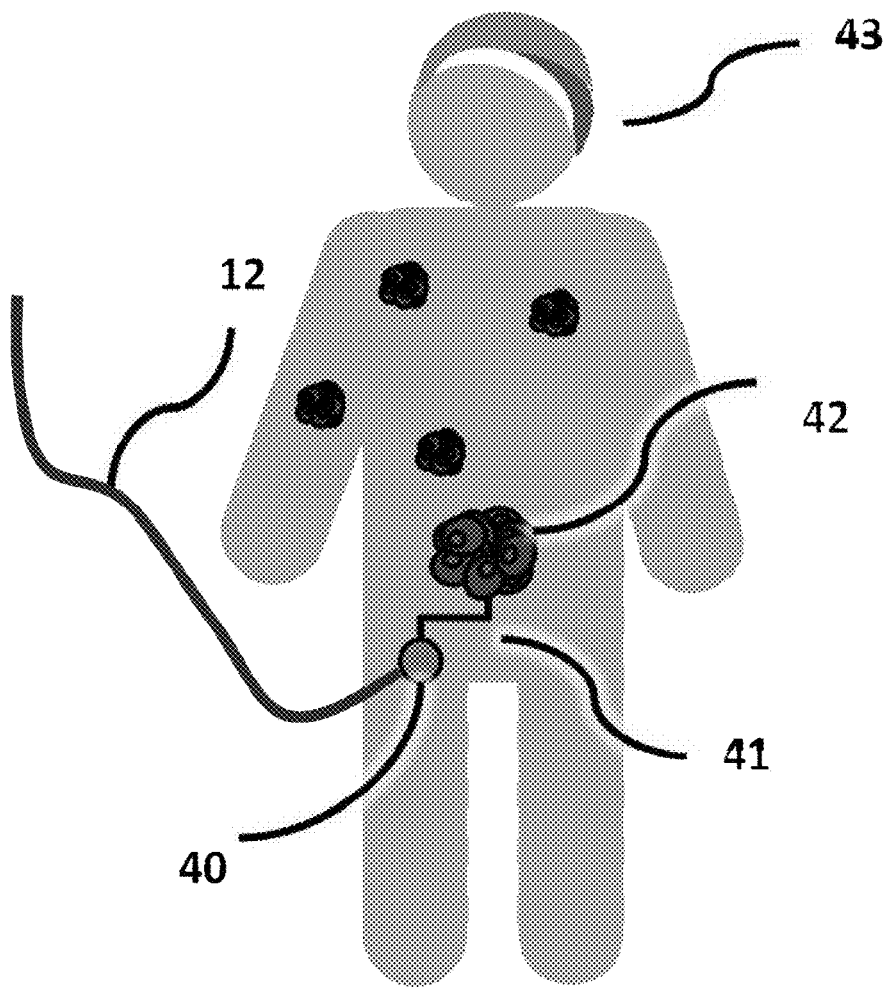

In FIG. 15, an integrated, modular, and self-contained device (1) (also see FIGS. 3-10) is shown for electrochemically activating a precursor compound and delivering activated compound to an implanted microinfusion pump and/or chemical injection port (40), or to an implanted catheter device (41), is depicted. The implanted catheter device (41) may be fenestrated or non-fenestrated to better allow diffusion of the activated prodrug into cancerous tissue (42) in the subject (43). As shown in FIGS. 15A and 15B, the illustrated device (1) includes the electrochemical reactor (2) as depicted in FIG. 2 and described in Example 1 above, and a power supply (14) for providing power and electrical control to the electrochemical reactor (2). In this example, the power supply is a potentiostat.

The illustrated device (1) further comprises a pump (19) for drawing active compound out of the precursor compound reservoir (20) which is in fluid communication with the electrochemical reactor (2). The electrochemical reactor (2) is in fluid communication with the active compound output (12), which is connected directly to an implanted microinfusion pump (40) (or chemical injection port, and/or catheter (41)). The implanted microinfusion pump, chemical injection port, and/or catheter (40, 41) is in direct fluid communication with a cancerous tissue or tumour (42) in the patient (43). The implanted microinfusion pump and/or chemical injection port (40) may or may not be electrochemical itself.

Figure 15C:
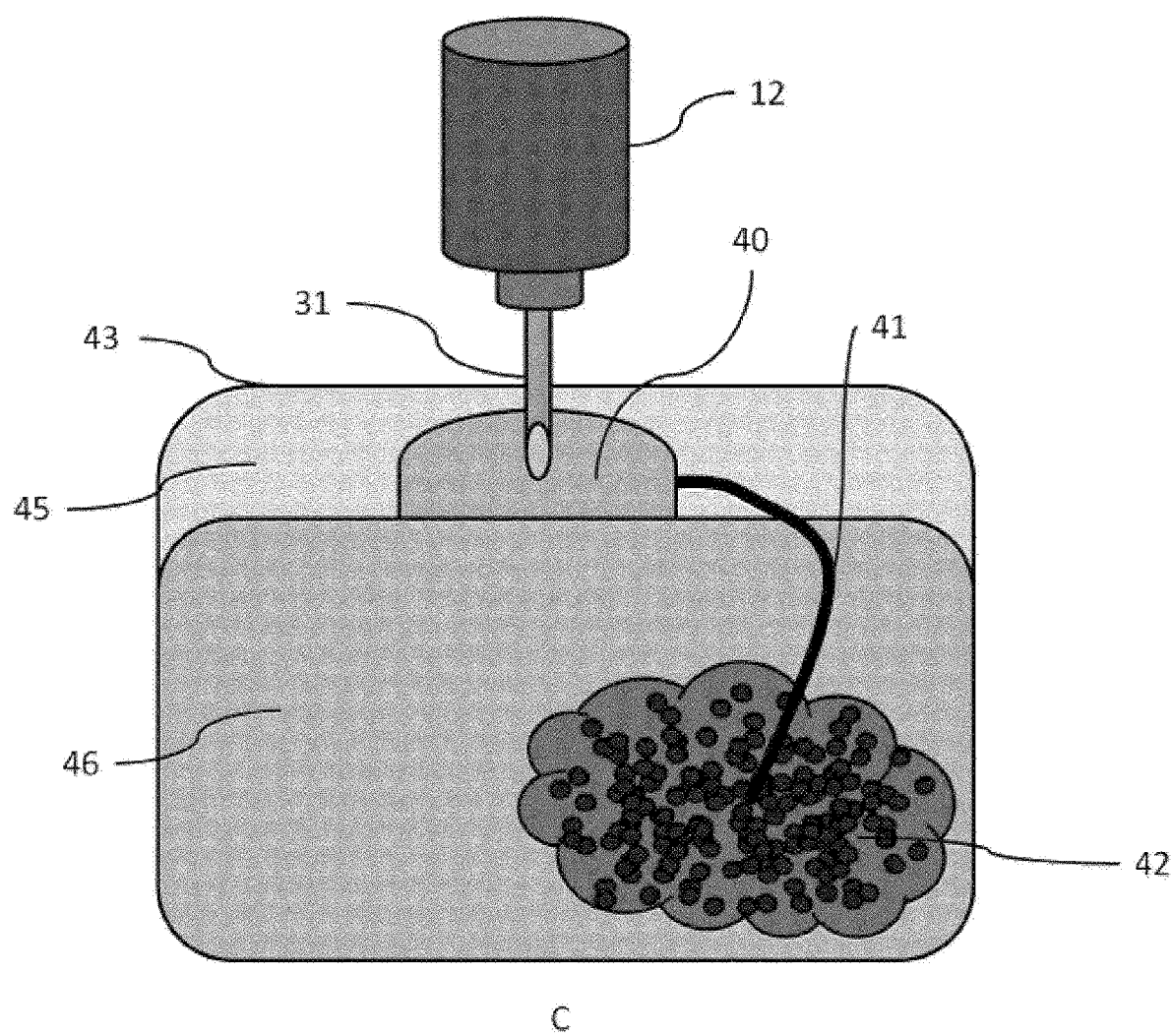

FIG. 15C depicts the connection of the device (1) to implanted microinfusion pump, chemical injection port, and/or catheter (40, 41), wherein the active compound output (12) is in fluid communication either via needle (31), or interlocking connector (not shown). The type of connection used by the device (1) is selected for compatibility with the type of implanted microinfusion pump, chemical injection port, and/or catheter (40, 41) used in the patient (43). In FIG. 15C, a needle (31) is used. The implanted microinfusion pump, chemical injection port, and/or catheter (40, 41) may be one which is typically be used for non-electrochemical infusion chemotherapy, and may be implanted under the skin, either sub-dermally or in the sub-cutaneous layer of tissue (45). The depicted implanted microinfusion pump, chemical injection port, and/or catheter (40, 41) is secured via suture to an inferior tissue layer (46) of the subject.

Figure 16B:
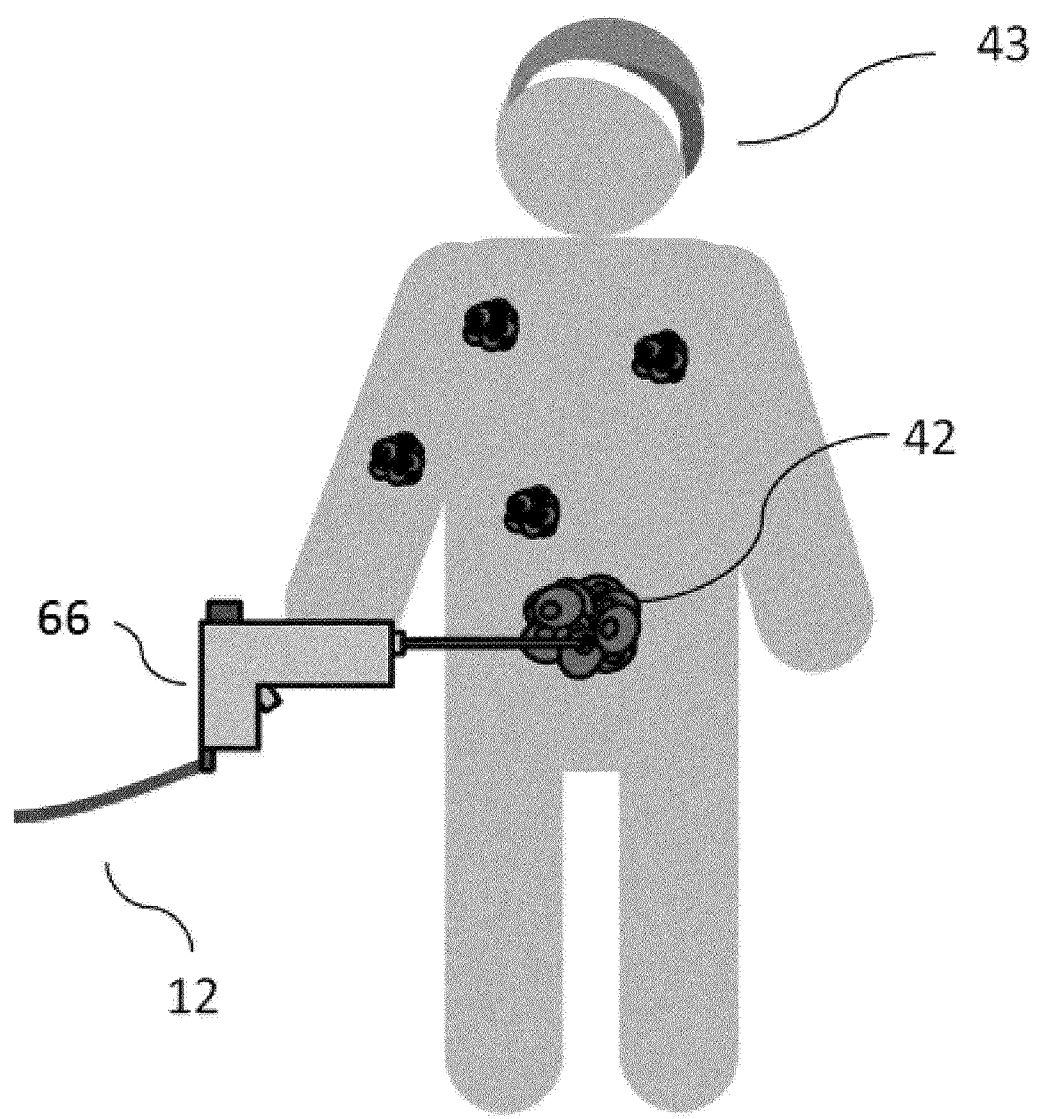

In the illustrated example shown in FIG. 16, an integrated, modular, and self-contained device (1) (also see FIGS. 3-10) for electrochemically activating a precursor compound and delivering activated compound to a tumour (42), either cancerous or non-cancerous, is depicted. As shown in FIGS. 16A and 16B, the illustrated device (1) includes the electrochemical reactor (2) as depicted in FIG. 2 and described in Example 1 above, and a power supply (14) for providing power and electrical control to the electrochemical reactor (2). In this example, the power supply is a potentiostat.

The illustrated device (1) further comprises a pump (19) for drawing precursor compound out of the precursor compound reservoir (20) which is in fluid communication with the electrochemical reactor (2). The electrochemical reactor (2) is in fluid communication with the active compound output (12) and is connected directly to a handheld injector (66). The handheld injector (66) is placed in direct fluid communication with the cancerous tumour (42) in the patient (43). In certain embodiments, the handheld applicator/injector may comprise, for example, a vaccine or vaccination gun, such as that typically used in veterinary or other such applications, or any other suitable dose metering syringe or applicator.

As will be understood, it is further contemplated that in certain embodiments, the handheld applicator and the device may not be in direct fluid communication. For example, in certain embodiments, the device (1) may instead be configured to output activated compound to an activated compound reservoir (not shown). A separate handheld applicator device may then be filled with activated compound from the activated compound reservoir, and then the subject may be injected with the activated compound using the handheld applicator device. Alternatively, the device (1) may be configured to fill a vial or other container with activated compound, and the vial or other container may then be removed from the device and installed on a separate handheld applicator for administration to a subject in need thereof.

Figure 16C:
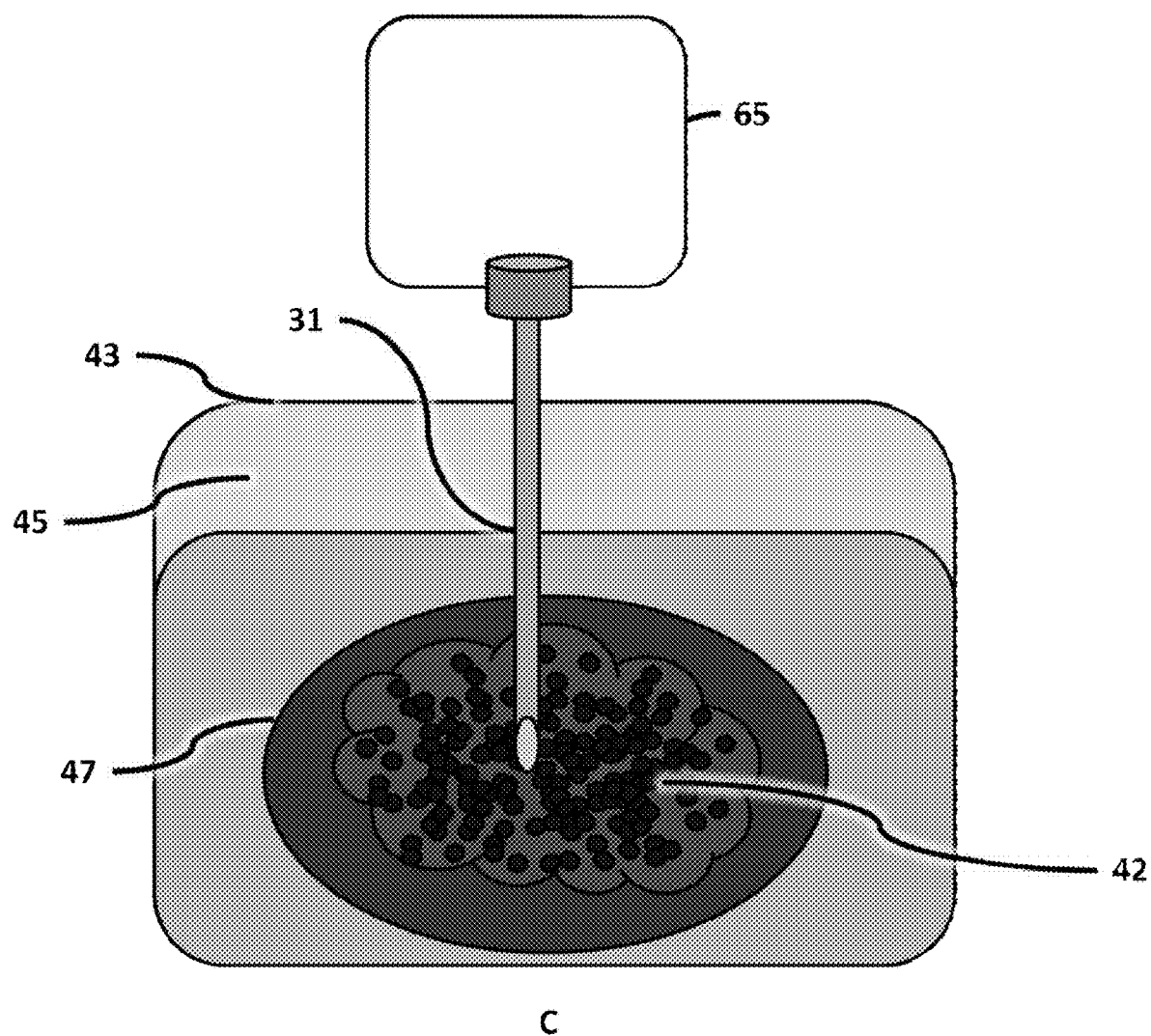

FIG. 16C depicts the handheld injector (66) of the device (1) placed in fluid communication with cancerous tissue (42) (via needle (31)), where the active compound output (12) is in fluid communication with needle (31). Active compound has been injected to the tumor via handheld applicator (65), and excess active compound (47) has surrounded the tumor (42).

Figure 17A:
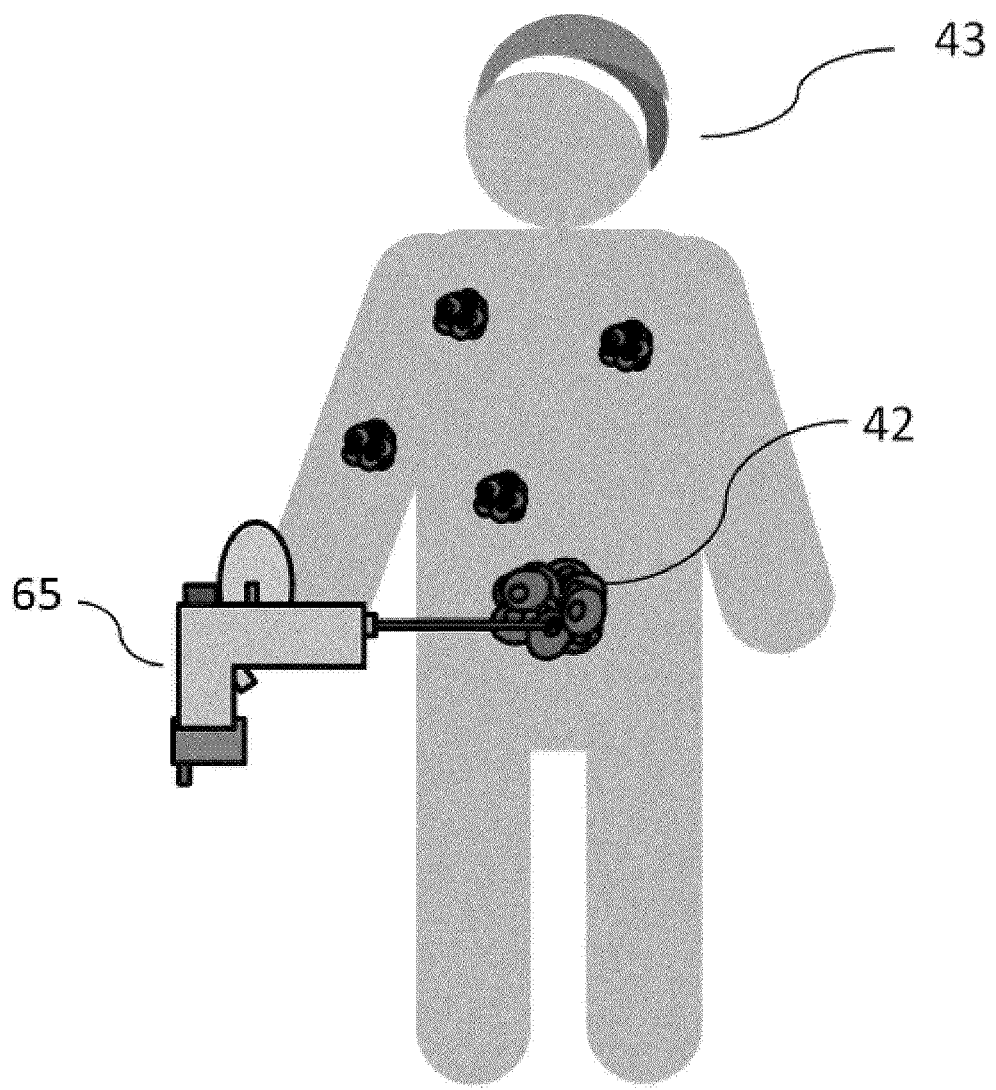
FIGS. 17A-B depict another embodiment of a device for electrochemically activating a precursor compound as described herein, in the form of a handheld applicator as shown in (A), being used for direct injection of activated compound into a tumour as shown in (B) (see also FIG. 12).
Figure 17B:
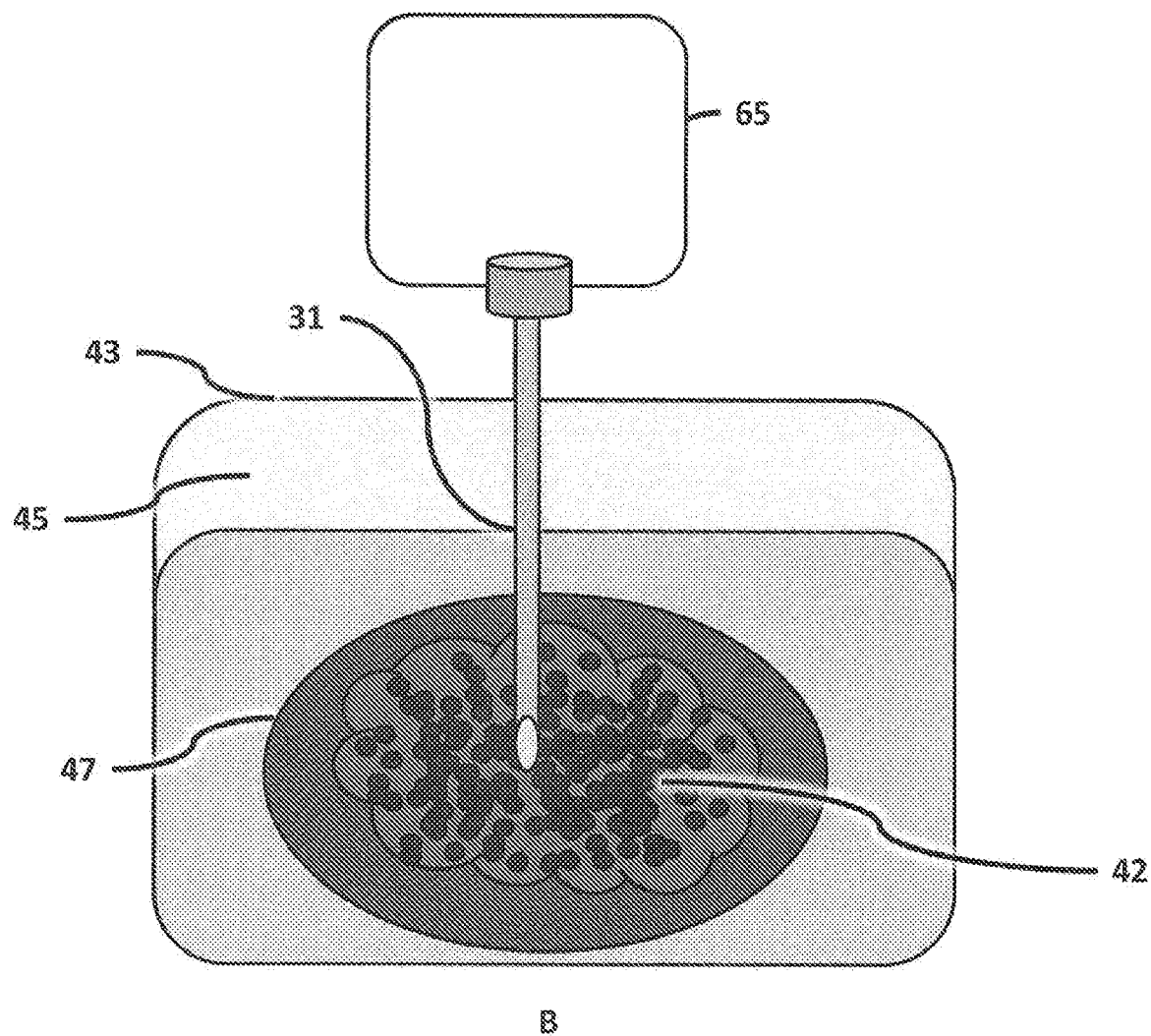

In the illustrated example shown in FIG. 17, an integrated, modular, handheld and self-contained device (65) in the form of a handheld applicator (also see FIG. 12) is shown for electrochemically activating a precursor compound and delivering active compound to a tumour (42), either cancerous or non cancerous. The illustrated device (65) includes an electrochemical reactor (2), and a power supply (14) for providing power and electrical control to the electrochemical reactor (2), as shown in further detail in FIG. 12. In this example, the power supply is a self-contained battery. As shown in further detail in FIG. 12, the illustrated device (65) further comprises an internal pump (19) for drawing active compound out of the precursor compound reservoir (20) which is in fluid communication with the electrochemical reactor (2). The electrochemical reactor (2) is in fluid communication with the active compound output (12). In FIG. 17A, the depicted handheld device (65) is in direct fluid communication with the cancerous tumour (42) in the patient (43). FIG. 17B depicts the fluid communication of the handheld device (65) to the cancerous tissue (42), wherein the active compound output (12) is in fluid communication with the cancerous tissue via needle (31). The injected active compound is applied directly to the tumour, and is purposely applied in excess of tumour volume to for excess active compound (47) surrounding the tumor in order to affect nearby cancerous cells (i.e. stage III cancer, in situ).

One or more illustrative embodiments have been described by way of example. It will be understood to persons skilled in the art that a number of variations and modifications can be made without departing from the scope of the invention as defined in the claims.

What is claimed is:

1. A handheld device for administering and electrochemically activating a liquid solution containing a precursor pharmaceutical to produce a liquid solution containing a biologically active pharmaceutical compound, said handheld device comprising:
    an electrochemical reactor comprising:
    an electrochemical cell comprising an anode and a cathode housed in a shared compartment, the anode and the cathode forming an electrical circuit in the presence of an electrolyte solution; or, an anode housed in an anode compartment, a cathode housed in a cathode compartment, and a semipermeable membrane separating the anode and cathode compartments, the anode and cathode forming an electrical circuit in the presence of an electrolyte solution;
    a sealed housing enclosing the electrochemical cell, the sealed housing including at least one precursor compound input in fluid communication with the anode compartment, or the shared compartment, for inputting the liquid solution containing the precursor pharmaceutical compound to be activated; an active compound output in fluid communication with the anode compartment or the shared compartment for outputting the liquid solution containing the biologically active pharmaceutical compound following electrochemical activation; and, at least one gas release and/or liquid overflow port, wherein the active compound output comprises a coupling for connecting to a medical device;
    a precursor compound reservoir holder placed in fluid communication with the at least one precursor compound input;
    a perforator positioned in the precursor compound reservoir holder for puncturing a septa of a precursor compound reservoir;
    a pump for moving the liquid solution containing the biologically active pharmaceutical compound through the active compound output;
    a power supply for providing and controlling power to the electrochemical reactor, wherein the power supply is a potentiostat or amperostat or both, and provides electrical control over voltage, current, or both;
    an external casing housing the electrochemical reactor, pump and power supply;
    a user interface positioned on the external casing for controlling the electrical current applied to the electrochemical cell and pump; and
    a pressure sensitive switch or trigger positioned on the exterior of the external casing for controlling the applied electrical current to the electrochemical cell and the pump to produce a flow rate of the liquid solution containing the pharmaceutical compound.

2. The device according to claim 1, wherein the external casing of the device comprises an access port for accessing the electrochemical reactor housed therein.

3. The device according to claim 1, wherein the anode compartment is substantially disposed within the cathode compartment.

4. The device according to claim 1, wherein the cathode comprises a coiled conductive member surrounding a central anode conductive member.

5. The device according to claim 1, wherein the precursor compound input comprises a plurality of holes formed in the sealed housing.

6. The device according to claim 1, wherein the gas release port vents to the atmosphere.

7. The device according to claim 1, wherein the liquid overflow port releases to a sealed waste container.

8. The device according to claim 1, wherein the at least one gas release and/or liquid overflow port comprises a check valve to regulate the internal operating pressure of the cell device.

9. The device according to claim 1, further comprising a precursor compound reservoir in fluid communication with the precursor compound input.

10. The device according to claim 1, further comprising an active compound reservoir in fluid communication with the active compound output of the device.

11. The device according to claim 1, wherein (i) the anode comprises an inactive anode material, and the cathode comprises a titanium wire cathode, or (ii) the anode comprises an active anode material, and the cathode comprises a plate-shaped cathode.

12. The device according to claim 1, wherein the semipermeable membrane comprises semipermeable high-silica, high-temperature glass; a semipermeable glass a dialysis membrane or an esterified dialysis membrane.

13. The device according to claim 1, wherein the external casing integrates with a holder on a stand, or with outer casings of a robotic or semi-robotic armature system.

14. The device according to claim 1, wherein an exchangeable cartridge is present in fluid communication with the pump inlet, said exchangeable cartridge composed of an electrochemical cell, a precursor compound reservoir holder, and a precursor compound reservoir perforator.

15. A method of electrochemically activating a precursor pharmaceutical compound to produce a biologically active pharmaceutical compound, said method comprising:
   inputting the precursor pharmaceutical compound into a device as defined in claim 1;
   operating the device to electrochemically activate the precursor pharmaceutical compound to produce the biologically active pharmaceutical compound; and
   outputting the biologically active pharmaceutical compound from the device.

\* \* \* \* \*